US011448566B2

(12) United States Patent
Gurvich et al.

(10) Patent No.: US 11,448,566 B2
(45) Date of Patent: Sep. 20, 2022

(54) APPARATUS AND METHOD FOR TESTING DRIVE SHAFT JOINTS

(71) Applicant: Hamilton Sundstrand Corporation, Charlotte, NC (US)

(72) Inventors: Mark R. Gurvich, Middletown, CT (US); Brayton Reed, New York Mills, NY (US); Kevin Thomas Gryk, Marcy, NY (US); Michael King, Sauquoit, NY (US); Joyel M. Schaefer, Earlville, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/241,516

(22) Filed: Apr. 27, 2021

(65) Prior Publication Data

US 2022/0026308 A1 Jan. 27, 2022

Related U.S. Application Data

(60) Provisional application No. 63/056,049, filed on Jul. 24, 2020.

(51) Int. Cl.
*G01M 13/027* (2019.01)
*G01M 13/022* (2019.01)

(52) U.S. Cl.
CPC ........ *G01M 13/027* (2013.01); *G01M 13/022* (2013.01)

(58) Field of Classification Search
CPC .... G01M 13/027; G01M 13/022; G01N 3/04; G01N 2203/0017; G01N 2203/0025; G01N 3/24
See application file for complete search history.

(56) References Cited

U.S. PATENT DOCUMENTS

| 3,559,472 A | 2/1971 | Thompson |
|---|---|---|
| 4,466,292 A | 8/1984 | Milazzo |
| (Continued) | | |

FOREIGN PATENT DOCUMENTS

| CN | 102425614 A | 4/2012 |
|---|---|---|
| JP | 2000081051 A | 3/2000 |
| WO | WO2011131995 A1 | 10/2011 |

OTHER PUBLICATIONS

Extended European Search Report for EP Application No. 21187638.8, dated Dec. 16, 2021, pp. 7.

*Primary Examiner* — Freddie Kirkland, III
(74) *Attorney, Agent, or Firm* — Kinney & Lange, P. A.

(57) ABSTRACT

A first shaft segment and a second shaft segment are joined by a first fastener and a second fastener to form a shaft test assembly. The first shaft segment and the second shaft segment are each curved between first and second circumferential ends. A method of testing a shaft includes displacing a first applicator part relative a second applicator part to exert a load on the shaft test assembly. The resulting shear stress on the shaft test assembly can be measured to determine material properties of the shaft. A first applicator part extends at least partially into the shaft test assembly and interfaces with the first shaft segment to apply a load. A second applicator part extends at least partially into the shaft test assembly and interfaces with the second shaft segment to apply a load.

20 Claims, 18 Drawing Sheets

(56) References Cited

U.S. PATENT DOCUMENTS

| | | | |
|---|---|---|---|
| 8,453,522 B2 * | 6/2013 | Bushey | G01M 13/027 73/862.581 |
| 10,775,249 B2 * | 9/2020 | Iyer | G01M 13/027 |
| 10,883,900 B2 * | 1/2021 | Baheti | G01M 13/00 |
| 2019/0195708 A1 | 6/2019 | Iyer et al. | |

* cited by examiner

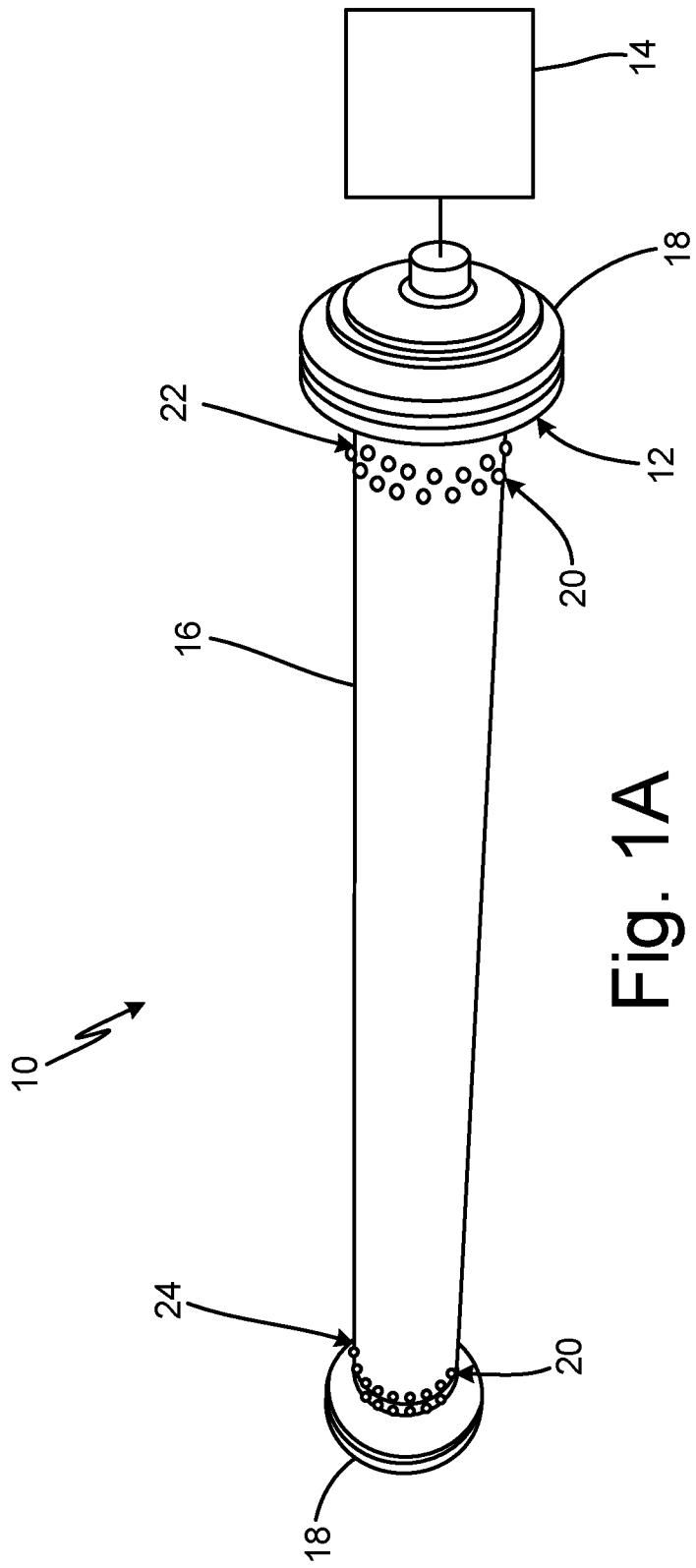

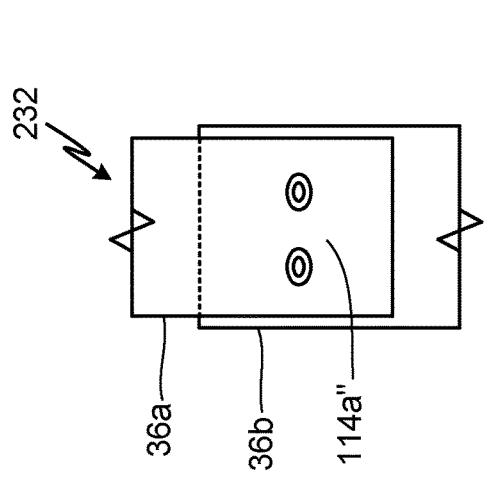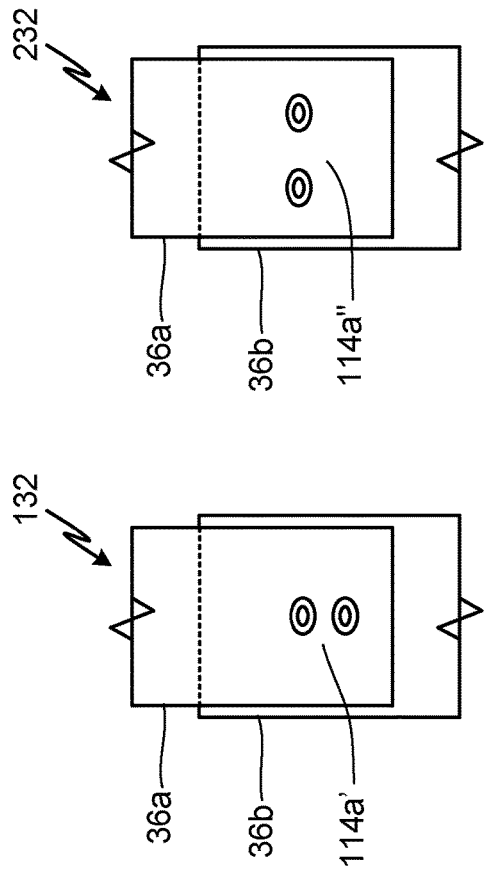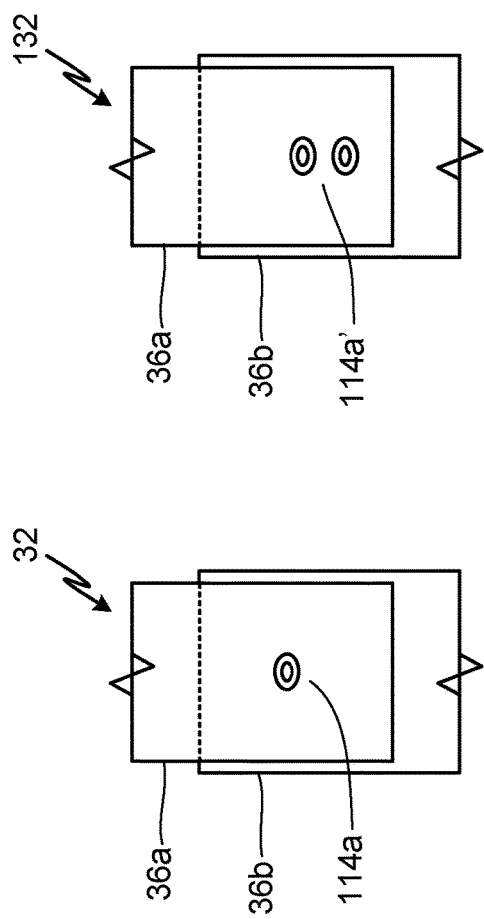

APPARATUS AND METHOD FOR TESTING DRIVE SHAFT JOINTS

CROSS-REFERENCE TO RELATED APPLICATION(S)

This application claims the benefit of U.S. Provisional Application No. 63/056,049 filed Jul. 24, 2020 for "APPARATUS AND METHOD FOR TESTING DRIVE SHAFT JOINTS" by M. R. Gurvich, B. Reed, K. T. Gryk, M. King and J. M. Schaefer.

BACKGROUND

This disclosure relates generally to testing of shafts. More particularly, this disclosure relates to testing drive shafts.

Drive shafts, such as composite shafts, are tested by preparing a length of shaft, fastening each end of the shaft to a diaphragm shaft, and applying a torque to the diaphragm shaft to test the load capacity of joints where fasteners join the drive shaft and diaphragm shaft. Generally, the weakest point of the drive shaft is the area immediately around the fasteners. To test the load capacity of the shaft in the vicinity of the fasteners, a near full scale length of drive shaft is rotated to exert shear forces on the circumferential array of fasteners joining the drive shaft and the diaphragm shaft. Such a method can be time and capital intensive, requiring extensive test facilities. In addition, a large area is required to fit the test machinery and mount the full length of the shaft. Therefore, a more efficient method of testing driveshafts with fastener-based connections is needed.

SUMMARY

According to one aspect of the disclosure, a method of testing a shaft includes displacing a first applicator part relative a second applicator part to exert a tensile force on a shaft test assembly and measuring the shear force generated by the tensile force in the shaft test assembly. The first applicator part extends at least partially through the shaft test assembly and contacts a first shaft segment of the shaft test assembly. The second applicator part extends at least partially through the shaft test assembly and contacts a second shaft segment of the shaft test assembly. The first shaft segment is connected to the second shaft segment by a first and second fastener.

According to another aspect of the disclosure, a shaft test assembly includes a first shaft segment having a first body extending from a first circumferential end to a second circumferential end, a second shaft segment having a second body extending from a third circumferential end to a fourth circumferential end, a first fastener extending through the first body and the second body, and a second fastener extending through the first body and the second body. The second fastener is disposed opposite the first fastener.

According to yet another aspect of the disclosure, a shaft test system includes a shaft test assembly having an axis, a first applicator part extending into the shaft test assembly and contacting the first body of the shaft test assembly, and a second applicator part extending into the shaft test assembly and contacting the second body of the shaft test assembly. The shaft test assembly includes a first shaft segment having a curved first body extending from a first circumferential end to a second circumferential end, a second shaft segment having a curved second body extending from a third circumferential end to a fourth circumferential end, a first fastener extending through the first body and the second body, and a second fastener extending through the first body and the second body. The first internal part is configured to exert a first force on the first body in a first radial direction and the second internal part is configured to exert a second force on the second body in a second radial direction. The first radial direction is opposite the second radial direction.

BRIEF DESCRIPTION OF THE DRAWINGS

FIG. 1A is a perspective view of a prior art test system.

FIG. 11A is a side view showing a first fastener arrangement.

FIG. 11B is a side view showing a second fastener arrangement.

FIG. 11C is a side view showing a third fastener arrangement.

FIG. 11D is a side view showing a fourth fastener arrangement.

FIG. 11E is a side view showing a fifth fastener arrangement.

FIG. 11F is a side view showing a sixth fastener arrangement.

DETAILED DESCRIPTION

Figure 1B:
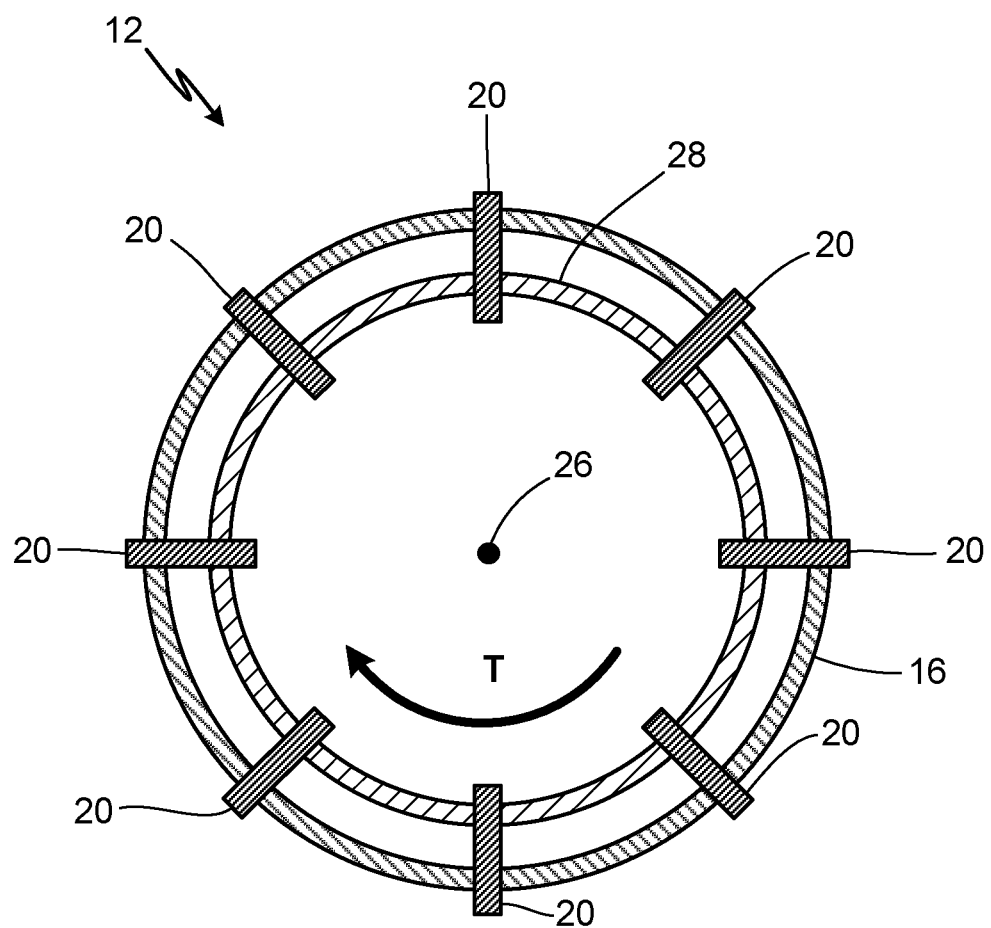
FIG. 1B is a cross-sectional view of a prior art test assembly taken through a fastener joint.

FIG. 1A is a perspective view of a prior art shaft testing system 10. FIG. 1B is a cross-sectional view of a prior art shaft test assembly 32 taken through a fastener joint. FIGS. 1A and 1B will be discussed together. Shaft testing system 10 includes shaft test assembly 12 and drive 14. Shaft test assembly 12 includes drive shaft 16, drive diaphragms 18, and fasteners 20. Drive shaft 16 includes first end 22, second end 24, and drive shaft axis 26. Each of drive diaphragms 18 includes diaphragm shaft 28 (FIG. 1B).

One of drive diaphragms 18 is attached to first end 22 of drive shaft 16 by a first array of fasteners 20. The other drive diaphragm 18 is attached to second end 24 of drive shaft 16 by a second array of fasteners 20. The fasteners 20 are circumferentially arranged about drive shaft axis 26. The diaphragm shafts 28 of drive diaphragms 18 are concentrically aligned with drive shaft 16 and extends at least partially into drive shaft 16. Drive shaft 16 is supported at first end 22 and second end 24 by drive diaphragm shafts 28. In the example shown, drive 14 is attached to one of drive diaphragms 18. It is understood that drive 14 can be, or be representative of, an aircraft component, such as an engine, gearbox, bearing hanger, or other type component of having a drive shaft.

Drive shaft 16 is rotatable about drive shaft axis 26. At least one of drive diaphragms 18 is connected to drive 14 such that drive 14 can drive rotation of drive shaft 16 via that diaphragm 18, associated diaphragm shaft 28, and the array of fasteners 20. Drive 14 applies or transfers torque to diaphragm 18 such that shear force is imparted at the fastener joints formed at the intersection of drive shaft 16, drive diaphragms 18, and fasteners 20. The shear force is measured to determine the load capacity of shaft test assembly 10, and specifically of drive shaft 16. The joint formed between fasteners 20 and drive shaft 16 is typically the portion of drive shaft assembly 12 most susceptible to damage. As such, the peak load capacity and failure point of the components of the joints, drive shaft 16, fasteners 20, and diaphragm shafts 28, are of particular importance.

Figure 2:
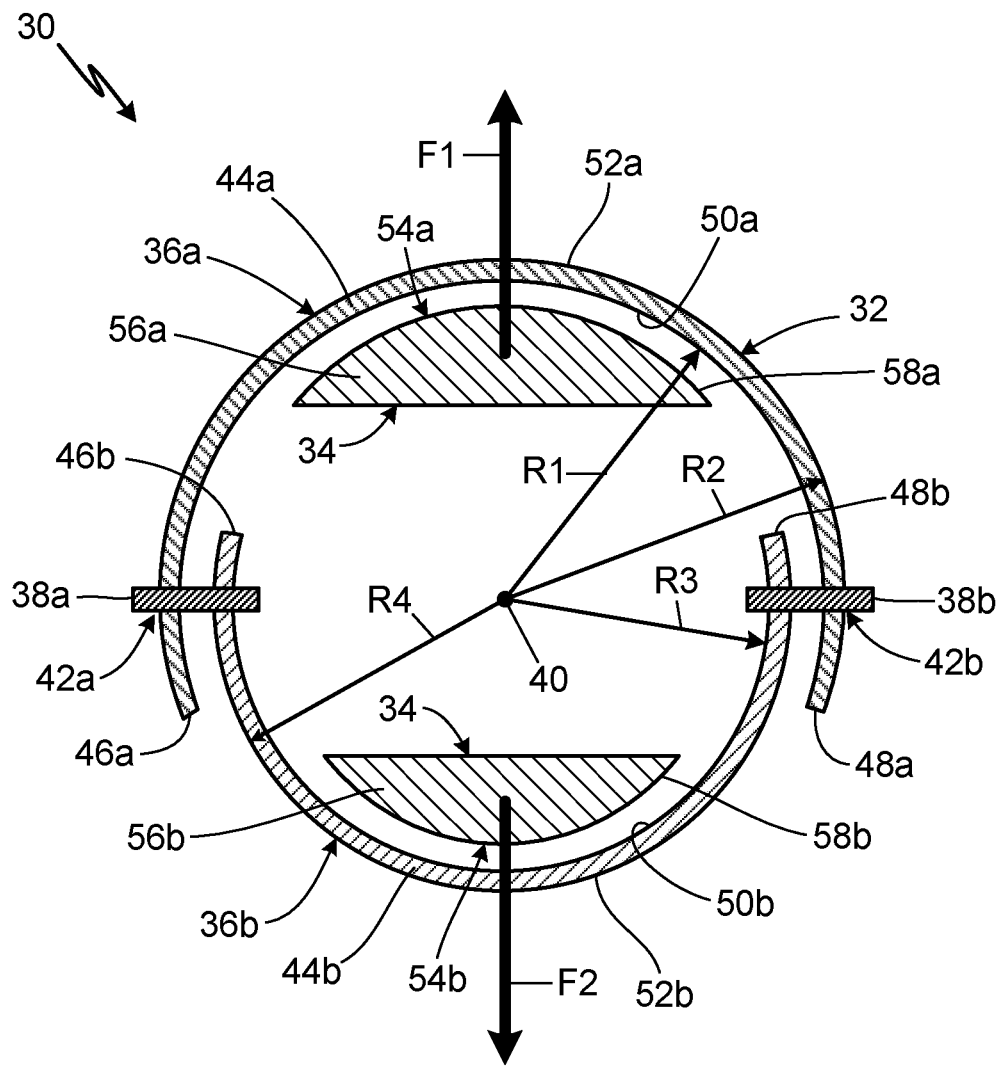
FIG. 2 is a cross-sectional view of a test system.

FIG. 2 is a cross-sectional view of shaft testing system 30. Shaft testing system 30 includes test assembly 32 and load applicator 34. Test assembly 32 includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Load applicator 34 includes applicator part 54a and applicator part 54b. Applicator part 54a includes applicator body 56a and applicator surface 58a. Applicator part 54b includes applicator body 56b and applicator surface 58b.

Shaft segment 36a is an arcuate segment such that segment body 44a is curved between first circumferential end 46a and second circumferential end 48a. Segment body 44a extends from first circumferential end 46a to second circumferential end 48a. In some examples shaft segment 36a is formed from a composite material such as fiber-reinforced polymer-matrix composite. In some examples, reinforcing fibers can include carbon, glass, and organic fibers among others. In some examples, polymer matrices can include thermosets and thermoplastics. In some examples, shaft segment 36a is formed from a composite draft shaft. Shaft segment 36a is formed such that a circumferential gap between first circumferential end 46a and second circumferential end 48a is less than the circumferential length of segment body 44a. As such, segment body 44a extends greater than 180-degrees. Inner surface 50a is formed on the innermost radial side of segment body 44a relative axis 40. Outer surface 52a is formed on the outermost radial side of shaft segment 36a relative axis 40.

Shaft segment 36b is an arcuate segment such that segment body 44b is curved between first circumferential end 46b and second circumferential end 48b. Segment body 44b extends from first circumferential end 46b to second circumferential end 48b. In some examples shaft segment 36b is formed from a metal. Shaft segment 36b is formed such that a circumferential gap between first circumferential end 46b and second circumferential end 48b is less than the circumferential length of segment body 44b. As such, segment body 44b extends greater than 180-degrees. Inner surface 50b is formed on the innermost radial side of segment body 44b relative to axis 40. Outer surface 52b is formed on the outermost radial side of shaft segment 36b relative to axis 40. In the example shown, the radial distance R1 between inner surface 50a and axis 40, and the radial distance R2 between outer surface 52a and axis 40, are each greater than the radial distance R3 between inner surface 50b and axis 40. In the example shown, the radial distance R1 is greater than the radial distance R4 between outer surface 52b and axis 40.

Shaft segment 36a is concentrically aligned with shaft segment 36b. Shaft segment 36a is disposed coaxially with shaft segment 36b. First circumferential end 46a circumferentially overlaps first circumferential end 46b such that a radial line extending from axis 40 can pass through each of shaft segment 36a and shaft segment 36b. Second circumferential end 48a circumferentially overlaps second circumferential end 48b such that a radial line extending from axis 40 can pass through each of shaft segment 36a and shaft segment 36b.

Fasteners 38a, 38b extend radially through segment body 44a and segment body 44b to secure shaft segment 36a to shaft segment 36b and form test assembly 32. Fastener 38a extends through segment body 44a and segment body 44b to form fastener joint 42a. Fastener 38b extends through segment body 44a and segment body 44b to form fastener joint 42b. In some examples, fasteners 38a, 38b are disposed 180-degrees apart from each other about axis 40. A line passing through axis 40 can pass through each of fasteners 38a, 38b. Fasteners 38a, 38b can be of any suitable configuration for securing shaft segment 36a to shaft segment 36b, such as rivets, bolts, posts, rods, and/or dowels, among other options.

Load applicator 34 interfaces with test assembly 32 and is configured to displace shaft segment 36a relative shaft segment 36b to exert shear forces at fastener joints 42a, 42b. Applicator part 54a extends along axis 40 and at least partially into test assembly 32. Applicator part 54a can extend fully through test assembly 32. Applicator part 54b extends along axis 40 and at least partially into test assembly 32. Applicator part 54b can extend fully through test assembly 32. Applicator surface 58a is configured to interface with and, in some examples, directly contact inner surface 50a. Applicator part 54a can be disposed within the circumferential gap between first circumferential end 46b and second circumferential end 48b. Applicator surface 58b is configured to interface with and, in some examples, directly contact inner surface 50b. It is understood that applicator part 54a and applicator part 54b can be formed from the same or different materials. It is further understood that applicator part 54a and applicator part 54b can be considered as separate components that are displaceable relative each other.

During operation, load applicator 34 is configured to apply opposite forces to test assembly 32 to exert a tensile load on test assembly 32 by displacing shaft segment 36a relative shaft segment 36b. One of applicator part 54a and applicator part 54b can be displaced relative the other of applicator part 54a and applicator part 54b. Applicator parts 54a, 54b contact shaft segments 36a, 36b, respectively, and exert the forces on shaft segments 36a, 36b to cause the relative displacement such that shear stresses are imparted at fastener joints 42a, 42b. It is understood that load applicator 34 can be of any configuration suitable for displacing applicator parts 54a, 54b, and thus shaft segments 36a, 36b, relative each other to generate shear stresses at fastener joints 42a, 42b. For example, load applicator 34 can be powered pneumatically, hydraulically, electrically, mechanically, on by any other suitable power source. For example, load applicator 34 can be a spreader, a puller, or of any other suitable configuration.

Load applicator 34 applies force F1 to test assembly 32 through applicator part 54a. In some examples, force F1 is transmitted through direct contact between applicator surface 58a and inner surface 50a. Force F1 can be a point load, multiple point loads, or a distributed load, among other options, or some combination of load types. Load applicator 34 applies force F2 to test assembly 32b through applicator part 54b. In some examples, force F2 is transmitted through direct contact between applicator surface 58b and inner surface 50b. Force F2 can be a point load, multiple point loads, or a distributed load, among others, or some combination of load types. It is understood that force F2 can be a corresponding reaction force to the force F1 such that force F2 is equal to force F1 and is oriented in a direction opposite force F1. In some examples, force F1 and/or force F2 can be applied slowly to mimic static or quasi-static behavior, applied quickly to mimic dynamic behavior, applied cyclically to mimic fatigue load, or applied by a combination of various load scenarios. It is understood that parameters of slow, quick, and cyclic loading can be defined as representations of expected load scenarios encountered during operation, including their values, durations, and speeds. For example, the loading parameters can be based on expected load scenarios encountered in an aircraft component, such as an engine, gearbox, bearing hanger, or other type of component having a drive shaft. In the example, force F1 and/or force F2 can be applied as displacement-controlled or force-controlled processes or any combination.

Forces F1 and F2 can be applied radially relative axis 40 and are applied in opposite directions to exert a tensile load on test assembly 32. The forces are transmitted by segment bodies 44a, 44b to fastener joints 42a, 42b such that fastener joints 42a, 42b experience shear forces. The shear forces experienced by fastener joints 42a, 42b are measured. The point at which fastener joints 42a, 42b are under the maximum of forces F1 and F2, but maintain structural integrity, is recorded as the maximum load capacity. Past the maximum load capacity, fastener joints 42a, 42b lose structural integrity. The point at which fastener joints 42a, 42b experience a total failure is recorded as the critical failure point. From these data points, functional load capacities of fastener joints 42a, 42b, shaft segments 36a, 36b, and fasteners 38a, 38b can be determined.

In a load test, one of shaft segments 36a, 36b can be the test sample that is being tested and the one that the data is relevant to. For example, the interface between composite shafts and fasteners typically form the failure point for fastener joints. The test sample can be, for example, composite shaft segment 36a. Shaft segment 36b can be formed from a material having different material properties than shaft segment 36a to resist the shear stress, such that the fastener joint will fail at the test sample shaft segment 36a first. For example, shaft segment 36b can be formed from a metal, an alloy, or other composite material. The force data and/or displacement data can then be used to determine failure points for shafts having the same radii and material properties as the test segment. The data can be used to determine operating loads for the shafts and shaft assemblies formed in the same manner as shaft segments 36a, 36b, fasteners 38a, 38b, and/or fastener joints 42a, 42b.

Shaft testing system 30 provides significant advantages. Shaft testing system 30 uses less shaft material, fewer fasteners 38a, 38b, and less power to test the load capacity of fastener joints 42a, 42b and shaft segments 36a, 36b. In some examples, shaft segment 36a and shaft segment 36b are shorter than a full length of drive shaft 60 (FIG. 1A). Further, in some examples, fasteners 38a, 38b are each formed by individual rivets rather than the plurality of fasteners circumferentially arranged about the shaft assembly. Fastener joints 38a, 38b are limited to the areas where shaft segments 36a, 36b circumferentially overlap. Shaft segments 36a, 36b are joined only at the circumferentially overlapping first circumferential ends 46a, 46b and the circumferentially overlapping second circumferential ends 48a, 48b. Shaft segments 36a, 36b are joined by a smaller number of fasteners 38a, 38b at each fastener joints 42a, 42b relative a full-size test assembly. Thus, shaft testing system 30 requires less power to generate the same shear stress and load capacity information as drive shaft testing system 30 (FIG. 1A) because fewer fasteners are present to resist the shear stress. Use of fewer fasteners 38a, 38b and shorter sections of shaft material also results in cost savings per test. In addition, the use of shaft segments 36a, 36b in shaft testing system 30 allows for a smaller testing footprint as compared to shaft testing system 30, and the samples can be prepared more quickly by using fewer fasteners 38a, 38b. Therefore, shaft testing system 30 provides significant space, and time, efficiency advantages. Moreover, savings on materials, space efficiency gains, and time efficiency gains result in a reduction of cost per test.

Figure 3A:
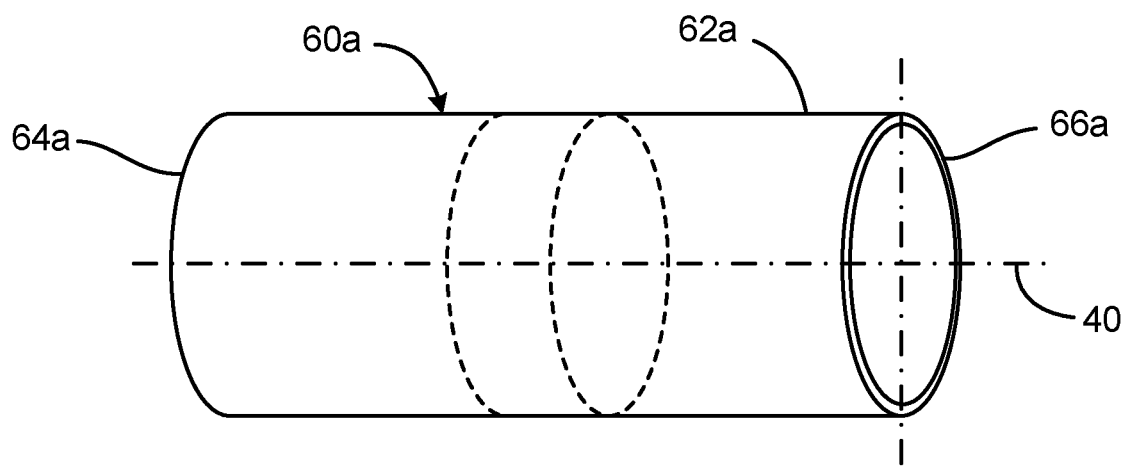
FIG. 3A is a perspective view of a first shaft.
Figure 3B:
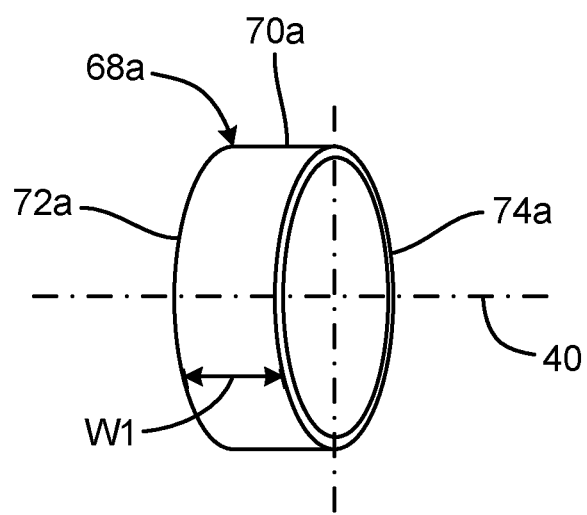
FIG. 3B is a perspective view of a section of the first shaft.
Figure 3C:
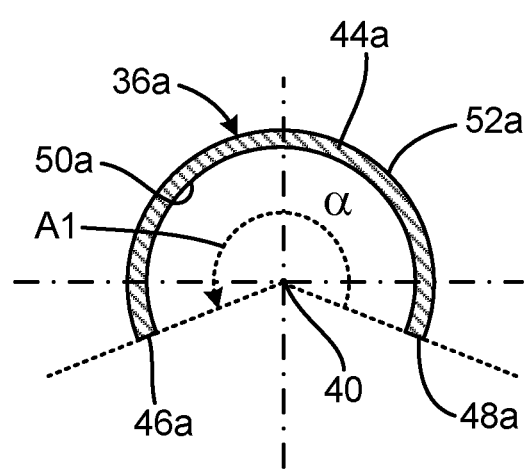
FIG. 3C is a cross-sectional view of a test segment of the first shaft prepared for testing

FIG. 3A is an isometric view of shaft 60a. FIG. 3B is an isometric view of shaft section 68a. FIG. 3C is a cross-sectional view of shaft segment 36a. FIGS. 3A, 3B, and 3C will be discussed together. Shaft 60a includes shaft body 62a, first axial end 64a, and second axial end 66a. Shaft section 68a includes shaft section body 70a, first axial section end 72a, and second axial section end 74a. Shaft segment 36a includes segment body 44a, first circumferential end 46a, second circumferential end 48a, inner surface 50a, and outer surface 52a.

Shaft body 62a forms a hollow cylinder about axis 40 and extends between first axial end 64a and second axial end 66a. First axial end 64a and second axial end 66a are disposed relative one another along axis 40.

Shaft section 68a is formed from shaft body 62a and similarly forms a hollow cylinder about axis 40. Shaft section body 70a extends between first axial section end 72a and second axial section end 74a. First axial section end 72a and second axial section end 74a are disposed relative one another along axis 40 such that shaft section 68a has a width W1. Width W1 of shaft section 68a is smaller than the full width of drive shaft 60a such that the axial distance between first axial section end 72a and second axial section end 74a is less than the axial distance between first axial end 64a and second axial end 66a. Width W1 can be defined according to sizes of shaft 60a including the diameter and/or thickness of shaft 60a. Width W1 can depend on the length of the circumferential overlap between shaft segment 36a and shaft segment 36b. In some examples, width W1 can be based on the width of the fastener openings through which fasteners 38a, 38b extend. Width W1 can be based on a diameter of the portion of the fastener extending through the shaft segment 36a. For example, the axial spacing between the edge of a fastener opening and the axial end of the shaft segment 36a can be at least the same as the diameter of the fastener opening. In the example shown in FIG. 2, width W1 can be defined as at least three times the diameter of the hole through which a fastener 38a, 38b extends. In some examples, such as where each fastener joint includes multiple fasteners 38a, 38b, width W1 can be at least one diameter of the hole through which fasteners 38a, 38b extend wider than the most axially distant ones of fasteners 38a, 38b. In addition, the spacing between each fastener can be at least the diameter of the fastener opening.

Shaft segment 36a is an arcuate segment such that segment body 44a is curved between first circumferential end 46a and second circumferential end 48a. Segment body 44a extends from first circumferential end 46a to second circumferential end 48a. In some examples shaft segment 36a is formed from a composite. Shaft segment 36a is formed such that a circumferential gap between first circumferential end 46a and second circumferential end 48a is less than the circumferential length of segment body 44a. As such, angle A1, which measures the circumferential arc of segment body 44a between first circumferential end 46a and second circumferential end 48a, is greater than 180-degrees. Inner surface 50a is formed on the innermost radial side of segment body 44a relative axis 40. Outer surface 52a is formed on the outermost radial side of shaft segment 36a relative axis 40.

During operation shaft segment 36a is formed by first cutting a width W1 from a longer portion of shaft 60a to form shaft section 68a. Shaft section 68a can be cut from shaft 60a in any desired manner. A portion of the circumferential wall of shaft section 68a is then removed to form the circumferential gap in shaft segment 36a. The portion removed can an arc less than 180-degrees such that angle A1 is at least 180-degrees. The portion can be removed from shaft section 68a to form the circumferential gap in any desired manner.

Shaft segment 36a provides significant advantages. Shaft segment 36a requires less space and less shaft material than drive shaft 60. Shaft segment 36a is formed from shaft section 68a, which is itself formed from a larger shaft 60a. As such, the length of shaft segment 36a can be less than drive shaft 60 and allows for a smaller testing footprint. Moreover, the use of less shaft material can reduce the cost per test. Different portions formed along the length of each drive shaft can also be individually tested to provide additional confidence in the manufacturing process. Therefore, shaft segment 36a provides space, cost, and efficiency advantages.

Figure 4A:
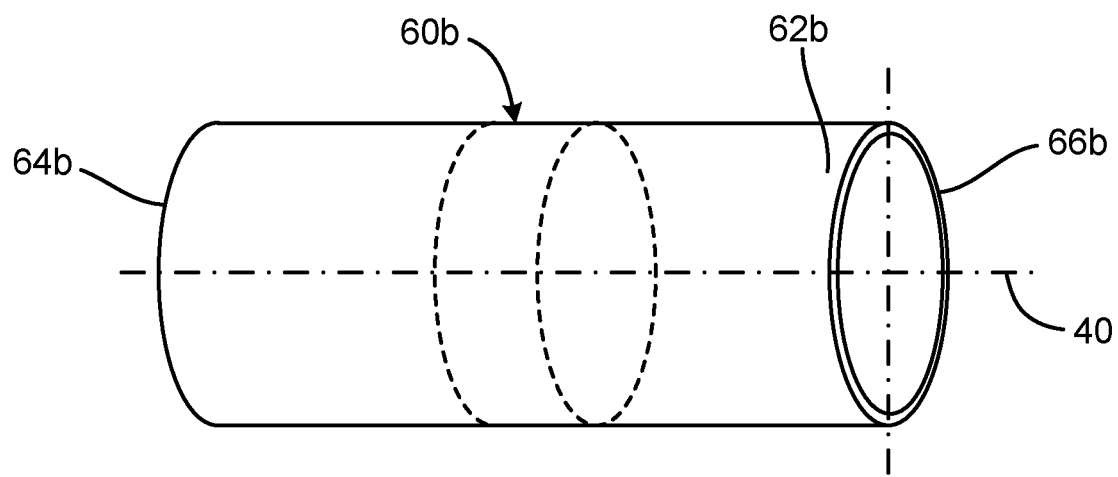
FIG. 4A is a perspective view of a second shaft.
Figure 4B:
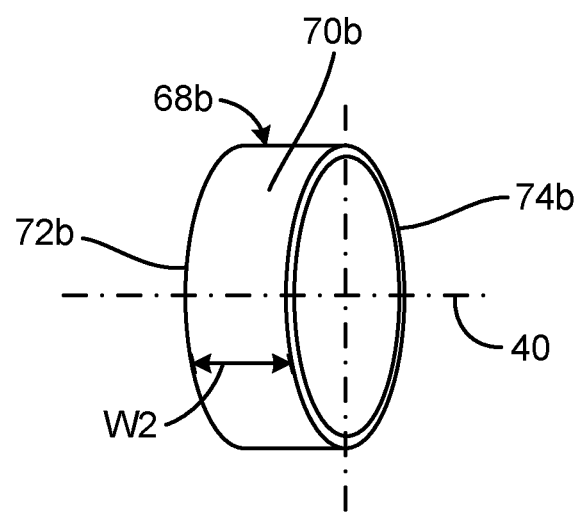
FIG. 4B is a perspective view of a section of the second shaft.
Figure 4C:
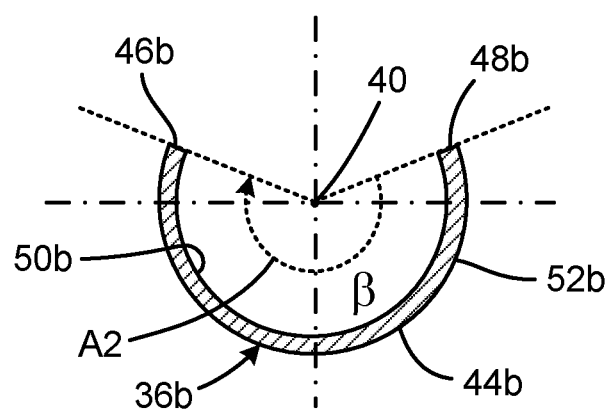
FIG. 4C is a cross-sectional view of a test segment of the second shaft prepared for testing.

FIG. 4A is an isometric view of shaft 60b. FIG. 4B is an isometric view of shaft section 68b. FIG. 4C is a cross-sectional view of shaft segment 36b. FIGS. 4A, 4B, and 4C will be discussed together. Shaft 60b includes shaft body 62b, first axial end 64b, and second axial end 66b. Shaft section 68b includes shaft section body 70b, first axial section end 72b, second axial section end 74b, and axis 40. Shaft segment 36b includes segment body 44b, first circumferential end 46b, second circumferential end 48b, inner surface 50b, and outer surface 52b.

Shaft 60b is substantially similar to shaft 60a, best seen in FIG. 3A. Shaft section 68b is substantially similar to shaft section 68b, best seen in FIG. 3B. Shaft segment 36b is substantially similar to shaft segment 36a best seen in FIG. 2 and FIG. 3C. In some examples, shaft segment 36b is formed from a metal while shaft segment 36a is formed from composite. Shaft section 68b is formed by cutting a ring from a longer shaft 60b such that shaft section 68b has a width W2. Width W2 can be defined according to sizes of shaft 60b including the diameter and/or thickness of shaft 60b. Width W2 can depend on the length of the circumferential overlap between shaft segment 36a and shaft segment 36b. In some examples, width W2 can be based on the width of the fastener openings through which fasteners 38a, 38b extend. Width W2 can be based on a diameter of the portion of the fastener extending through the shaft segment 36b. For example, the axial spacing between the edge of a fastener opening and the axial end of the shaft segment 36b can be at least the same as the diameter of the fastener opening. In the example shown in FIG. 2, width W2 can be defined as at least three times the diameter of the hole through which a fastener 38a, 38b extends. In some examples, such as where each fastener joint includes multiple fasteners 38a, 38b, width W2 can be at least one diameter of the hole through which fasteners 38a, 38b extend wider than the most axially distant ones of fasteners 38a, 38b. In addition, the spacing between each fastener can be at least the diameter of the fastener opening. In some examples, width W2 is equal to width W1. In some examples, width W2 can be slightly shorter or longer than width W1, or width W2 can be significantly longer than width W1.

Shaft segment 36b is formed by removing a portion of shaft section 68b such that a circumferential gap is formed between first circumferential end 46b and second circumferential end 48b. The portion is sized such that a circumferential length of the circumferential gap is less than the circumferential length of segment body 44b. Angle A2, which measures the circumferential arc of segment body 44b between first circumferential end 46b and second circumferential end 48b, is at least 180-degrees. The sum of angle A1 and angle A2 is greater than 360-degrees.

Figure 5:
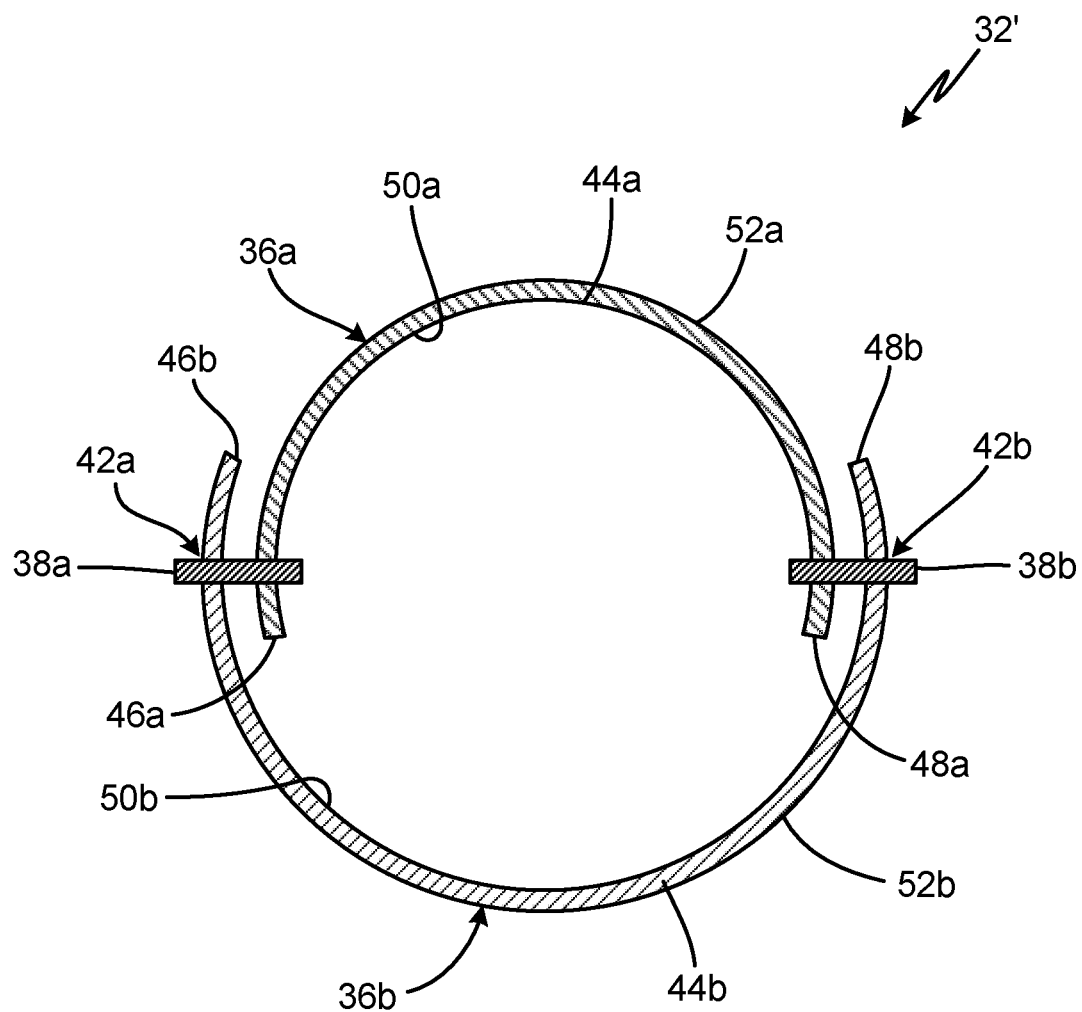
FIG. 5 is a cross-sectional view showing a second test assembly.

FIG. 5 is a cross-sectional view of test assembly 32'. Test assembly 32' includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b.

Test assembly 32' is substantially similar to test assembly 32 (best seen in FIG. 2). In the example shown, the composite shaft segment 36a has smaller radii than the metallic shaft segment 36b. The composite shaft segment 36a can extend within the metallic shaft segment 36b and be joined by fasteners 38a, 38b to form fastener joints 42a, 42b. Applicator part 54b (best seen in FIG. 2) can be disposed within the circumferential gap between first circumferential end 46a and second circumferential end 48a. The load is applied to test assembly 32' in substantially the same manner as test assembly 32 to generate the force and/or displacement data regarding the test segment.

Figure 6:
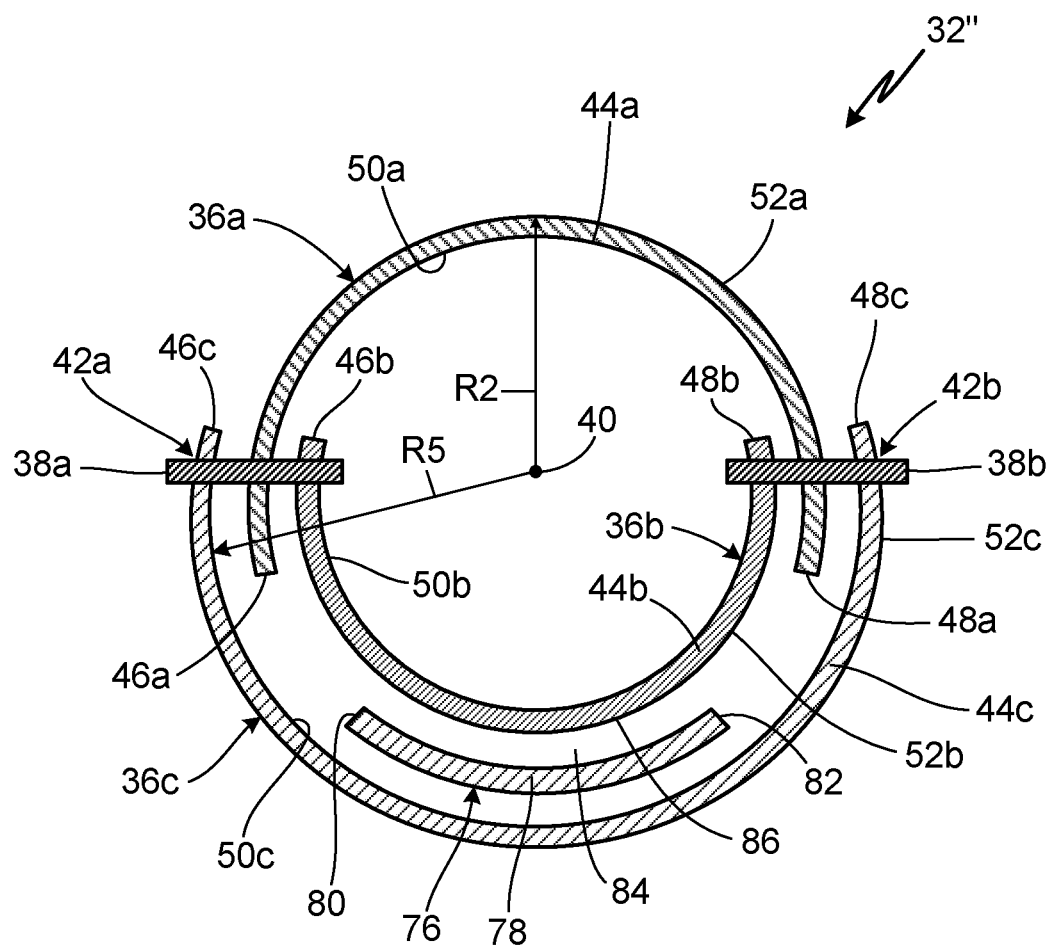
FIG. 6 is a cross-sectional view showing a third test assembly.

FIG. 6 is a cross-sectional view of test assembly 32". Test assembly 32" includes shaft segment 36a, shaft segment 36b, shaft segment 36c, spacer segment 76, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Shaft segment 36c includes segment body 44c, first circumferential end 46c, second circumferential end 48c, inner surface 50c, and outer surface 52c. Spacer segment 76 includes spacer body 78, first circumferential spacer end 80, second circumferential spacer end 82, inner spacer surface 84, and outer spacer surface 86.

Shaft segments 36a, 36b are the same as shaft segments 36a, 36b in FIG. 2. Shaft segment 36c is an arcuate segment such that segment body 44c is curved between first circumferential end 46c and second circumferential end 48c. Segment body 44c extends from first circumferential end 46c to second circumferential end 48c. In some examples, shaft segment 36c is formed from a metal. Shaft segment 36c is formed such that a circumferential gap between first circumferential end 46c and second circumferential end 48c is less than the circumferential length of segment body 44c. Inner surface 50c is formed on the inner most radial side of segment body 44c relative axis 40. Outer surface 52c is formed on the outer most radial side of shaft segment 36c relative axis 40. The radial distance R5 between inner surface 50c and axis 40 is greater than the radial distance R2 between outer surface 52a and axis 40.

Spacer segment 76 is an arcuate segment such that spacer body 78 is curved between first circumferential spacer end 80 and second circumferential spacer end 82. Spacer body 78 extends from first circumferential spacer end 80 to second circumferential spacer end 82. It is understood that spacer segment 76 can be formed from any suitable material for maintaining a radial gap between shaft segment 36a and shaft segment 36c. For example, spacer segment 76 is formed from a composite, metal, wood, foam, or other spacing material. Spacer segment 76 is formed such that a circumferential gap between first circumferential spacer end 80 and second circumferential spacer end 82 is greater than the circumferential length of spacer body 78. Spacer segment 76 extends across an arc less than the arc defining the circumferential gap between first circumferential end 46a and second circumferential end 46b. Inner spacer surface 84 is formed on the inner most radial side of spacer body 78 relative axis 40. Outer spacer surface 86 is formed on the outer most radial side of spacer body 78 relative axis 40. Spacer segment 76 can be disposed in the circumferential gap between first circumferential end 46a and second circumferential end 48a. The radial distance between axis 40 and inner spacer surface 84 can be equal to radius R1 and the radial distance between axis 40 and outer spacer surface 86 can be equal to radius R2.

Shaft segments 36a, 36b, and 36c are concentrically aligned. Shaft segments 36a, 36b, 36c are disposed coaxially. First circumferential end 46a circumferentially overlaps first circumferential ends 46b, 46c such that a radial line extending from axis 40 can pass through each of shaft segment 36a, shaft segment 36b, and shaft segment 36c. Second circumferential end 48a circumferentially overlaps second circumferential ends 48b, 48c such that a radial line extending from axis 40 can pass through each of shaft segment 36a, shaft segment 36b, and shaft segment 36c.

Fasteners 38a, 38b extend radially through segment bodies 44a, 44b, and 44c secure shaft segment 36a, shaft segment 36b, and shaft segment 36c together to form test assembly 32". Fastener 38a extends through segment bodies 44a, 44b, and 44c to form fastener joint 42a. Fastener 38b extends through segment bodies 44a, 44b, and 44c to form fastener joint 42b. In some examples, fasteners 38a, 38b are disposed 180 degrees apart from each other about axis 40. Fasteners 38a, 38b can be of any suitable configuration for securing shaft segment 36a to shaft segments 36b, 36c, such as rivets, bolts, posts, rods, and/or dowels, among other options. Spacer segment 76 is disposed circumferentially between first circumferential end 46a and second circumferential end 48a, and is disposed radially between shaft segments 36b, 36c.

During operation shaft segments 36a, 36b, 36c deform as forces F1 and F2 are applied, and fastener joints 42a', 42b' experience shear forces. Test assembly 32" can be used to isolate deformation of fastener joints 42a, 42b to fasteners 38a, 38b and shaft segment 36a by distributing the opposing tensile load between shaft segments 36b, 36c. Further, bending deformation between shaft segments 36b, 36c can be isolated by preventing relative bending deformation with spacer segment 76. Shaft segments 36b, 36c balance the load across fasteners 38a, 38b to further align the shear force at the interface between shaft segment 36a and fasteners 38a, 38b. Shaft test assembly 32''' can be particularly useful in examples where a composite shaft body 44a is connected with diaphragms using two shafts, i.e., one shaft 44b inside the shaft body 44a and another shaft 36c outside of the shaft body 44a.

Figure 7:
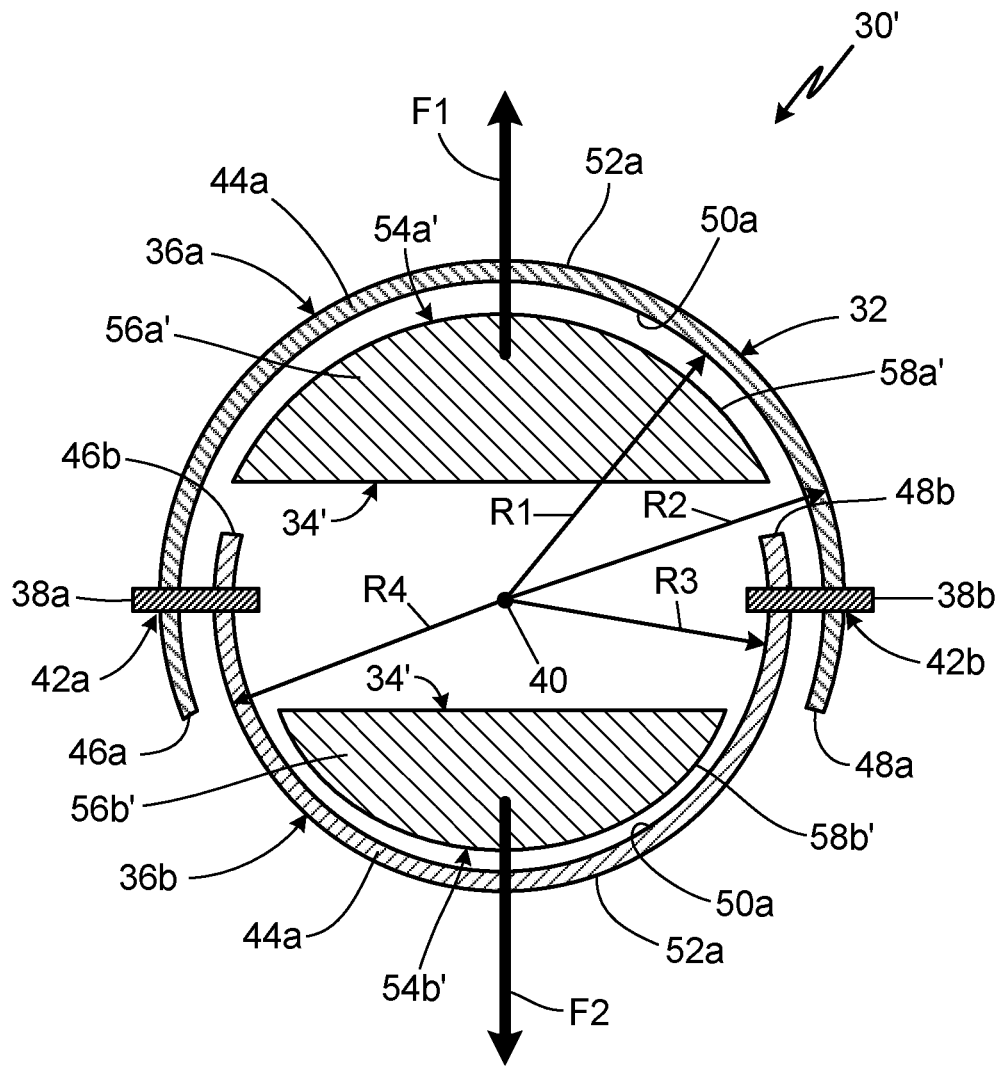
FIG. 7 is a cross-sectional view showing a first test system.

FIG. 7 is a cross-sectional view of shaft testing system 30'. Shaft testing system 30' includes test assembly 32 and load applicator 34'. Test assembly 32 includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Load applicator 34' includes applicator part 54a' and applicator part 54b'. Applicator part 54a' includes applicator body 56a' and applicator surface 58a'. Applicator part 54b' includes applicator body 56b' and applicator surface 58b'.

Shaft testing system 30' is substantially similar to shaft testing system 30 (best seen in FIG. 2). Load applicator 34' interfaces with test assembly 32 and is configured to displace shaft segment 36a relative shaft segment 36b to exert shear forces at fastener joints 42a, 42b. Applicator part 54a' has a semi-circular cross-section with a curved applicator surface 58a' configured to interface with and, in some examples, directly contact shaft segment 36a. Applicator part 54b' has a semi-circular cross-section with a curved applicator surface 58b' configured to interface with and, in some examples, directly contact shaft segment 36b. Applicator parts 54a', 54b' are configured to apply a distributed load to test assembly 32'. Applicator parts 54a', 54b' extend along axis 40 and at least partially into test assembly 32. Applicator parts 54a', 54b' can extend through test assembly 32. In the example shown, applicator part 54a' is disposed within the circumferential gap between first circumferential end 46b and second circumferential end 48b. In some examples, applicator part 54b' can be disposed within a circumferential gap between first circumferential end 46a and second circumferential end 48a.

During operation, load applicator 34' applies opposite forces to test assembly 32 to exert a tensile load on test assembly 32 by displacing shaft segment 36a relative shaft segment 36b. One of applicator part 54a' and applicator part 54b' can be displaced relative the other of applicator part 54a' and applicator part 54b'. Applicator parts 54a', 54b' interface with, and in some examples contact, shaft segments 36a, 36b, respectively, and exert the forces on shaft segments 36a', 36b' to cause the relative displacement such that shear stresses are imparted at fastener joints 42a, 42b. It is understood that load applicator 34' can be of any configuration suitable for displacing applicator parts 54a', 54b', and thus shaft segments 36a, 36b, relative each other to generate shear stresses at fastener joints 42a, 42b.

Load applicator 34' applies force F1 to test assembly 32 through applicator part 54a'. In some examples, force F1 is transmitted through direct contact between applicator surface 58a' and inner surface 50a. Load applicator 34' applies force F2 to test assembly 32b' through applicator part 54b'. In some examples, force F2 is transmitted through direct contact between applicator surface 58b' and inner surface 50b'. In some examples, the interfaces between applicator surfaces 58a', 58b' and inner surfaces 50a, 50b, respectively, are larger than the uncontacted area of inner surfaces 50a, 50b. In some examples, applicator surface 58a' has a radius of curvature larger than radius R4.

Forces F1 and F2 can be applied radially relative axis 40 and are applied in opposite directions to exert the tensile load on test assembly 32. The forces are transmitted by segment bodies 36a, 36b to fastener joints 42a, 42b such that fastener joints 42a, 42b experience shear forces. The shear forces experienced by fastener joints 42a, 42b are measured to determine a load capacity of the fastener joints 38a, 38b and shaft segment 36a.

Shaft testing system 30' has significant advantages. By configuring applicator parts 54a', 54b' to apply a distributed load, shaft testing assembly can isolate deformation to fastener joints 42a, 42b. Applicator surfaces 58a', 58b' prevent shaft segments 36a, 36b from bending under forces F1 and F2, and help transfer a greater portion of the tensile load to the fastener joints 42a, 42b to cause fastener joints 42a, 42b to experience shear forces. Thus, tests using shaft testing system 30' can further isolate bending deformation when determining the load capacities of shaft segments 36a, 36b, fasteners 38a, 38b, and/or fastener joints 42a, 42b.

Figure 8:
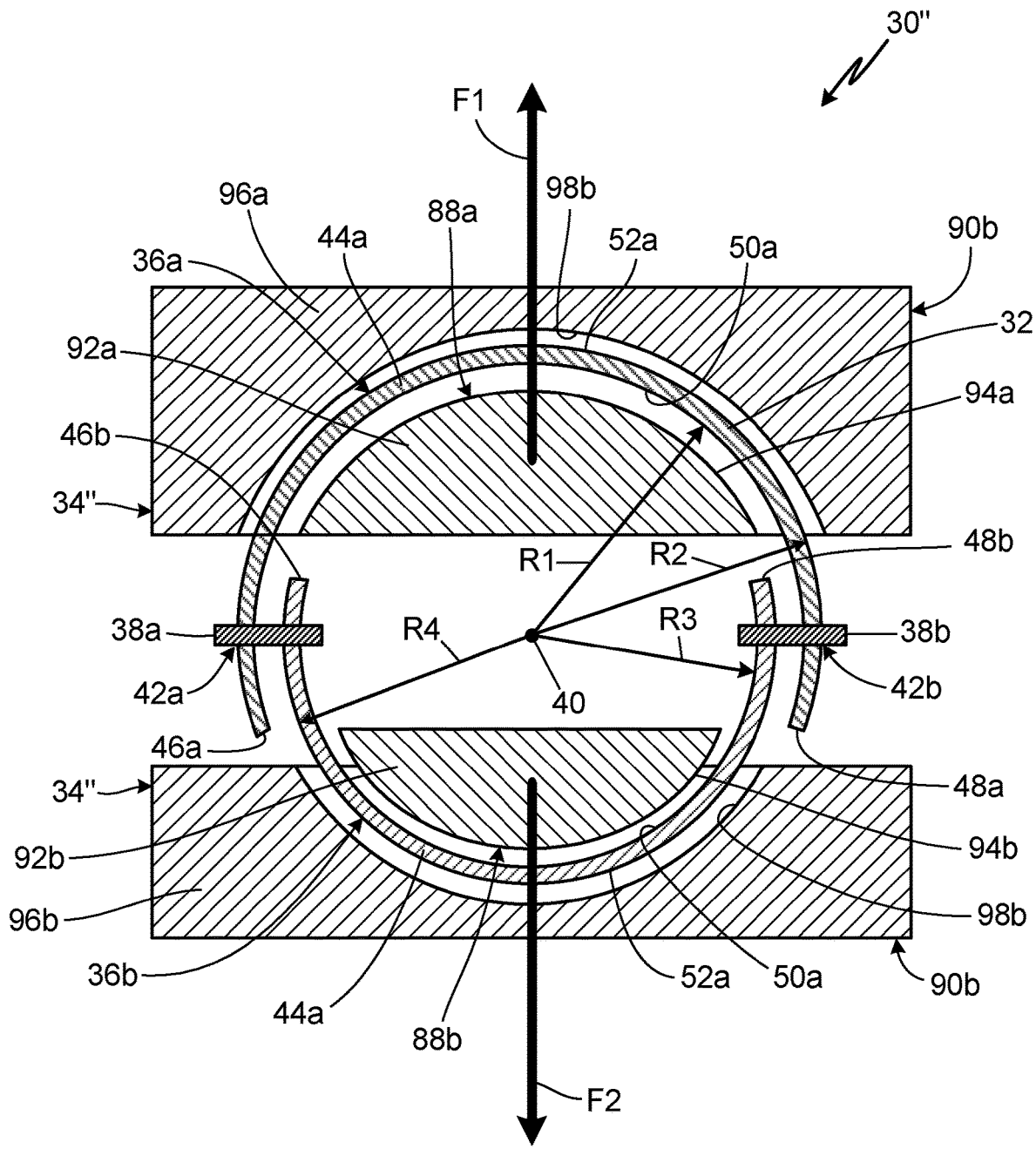
FIG. 8 is a cross-sectional view showing a second test system.

FIG. 8 is a cross-sectional view of shaft testing system 30". Shaft testing system 30" includes test assembly 32 and load applicator 34". Test assembly 32 includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Load applicator 34" includes internal applicator part 88a, internal applicator part 88b, external applicator part 90a, and external applicator part 90b. Internal applicator part 88a includes internal applicator body 92a and internal applicator surface 94a. Internal applicator part 88b includes internal applicator body 92b and internal applicator surface 94b. External applicator part 90a includes external applicator body 96a and external applicator surface 98a. External applicator part 90b includes external applicator body 96b and external applicator surface 98b.

Shaft testing system 30" is substantially similar to shaft testing system 30 (best seen in FIG. 2) and shaft testing system 30' (best seen in FIG. 7). Internal applicator part 88a has a semi-circular cross-section with a curved internal applicator surface 94a configured to interface with and, in some examples, directly contact shaft segment 36a such that internal applicator part 88a can apply a distributed load. Internal applicator part 88a can be a rod with a semi-circular cross-sectional profile, among other options. External applicator part 90a includes a concave groove configured to receive shaft segment 36a. External applicator surface 98a has a semi-circular cross-sectional profile. External applicator surface 98a has a curved external applicator surface 98a configured to interface with and, in some examples, directly contact shaft segment 36a such that shaft segment 36a is captured between external applicator part 90a and internal applicator part 88a. Internal applicator part 88a and external applicator part 90a form an assembly configured to apply a radial load to shaft segment 36a.

Internal applicator part 88b has a semi-circular cross-section with a curved internal applicator surface 94b configured to interface with and, in some examples, directly contact shaft segment 36b such that internal applicator part 88b can apply a distributed load. Internal applicator part 88b can be a rod with a semi-circular cross-sectional profile. External applicator part 90b includes a concave groove configured to receive shaft segment 36b. External applicator surface 98b has semi-circular cross-sectional profile. External applicator surface 98b has a curved external applicator surface 98b configured to interface with, and in some examples directly contact, shaft segment 36b such that shaft segment 36b is captured between external applicator part 90b and internal applicator part 88b. Internal applicator part 88b and external applicator part 90b form an assembly configured to apply a load to shaft segment 36b.

Internal applicator parts 54a, 54b extend along axis 40 and at least partially into test assembly 32. Internal applicator parts 54a, 54b can extend through test assembly 32. Internal applicator part 88a can be disposed within the circumferential gap between first circumferential end 46b and second circumferential end 48b. External applicator parts 54a, 54b extend along axis 40 and at least partially along the length of test assembly 32. External applicator parts 54a, 54b can extend axially through test assembly 32. External applicator part 90b can be disposed within the circumferential gap between first circumferential end 46a and second circumferential end 48a.

During operation, internal applicator part 88a and external applicator part 90a capture shaft segment 36a to prevent bending of shaft segment 36a. Internal applicator part 88b and external applicator part 90b capture shaft segment 36b to prevent bending of shaft segment 36b. Internal applicator part 88a and external applicator part 90a apply a distributed force F1 to shaft segment 36a and capture shaft segment 36a to prevent shaft segment 36a from bending during testing. Internal applicator part 88b and external applicator part 90b apply a distributed force F2 to shaft segment 36b and capture shaft segment 36b to prevent shaft segment 36a from bending during testing. For example, internal applicator parts 88a, 88b can exert the loads on shaft segments 36a, 36b, while external applicator parts 90a, 90b move with and are held steady relative internal applicator parts 88a, 88b to prevent bending of shaft segments 36a, 36b. By preventing bending deformation, shaft testing system 30" can further isolate shear stress at fastener joints 42a, 42b. It is understood that corresponding internal applicator surfaces 94a, 94b and external applicator surfaces 98a, 98b can be configured to follow an un-deformed shape of corresponding internal surfaces 50a, 50b and external surfaces 52a, 52b. In the example, load applicator 34" can minimize bending of shaft segments 36a, 36b, especially in examples with relatively thin walled shaft segments 36a, 36b.

Figure 9:
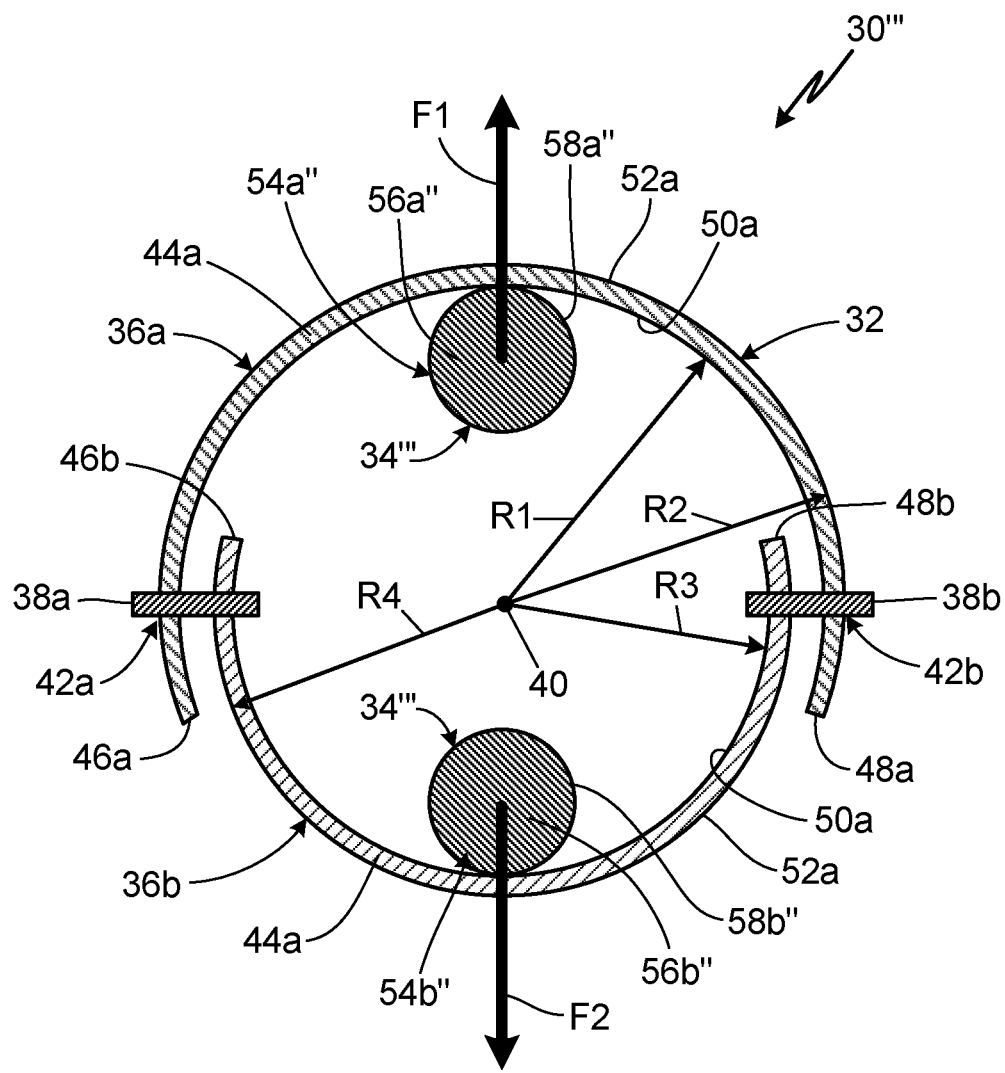
FIG. 9 is a cross-sectional view showing a third test system.

FIG. 9 is a cross-sectional view of shaft testing system 30'''. Shaft testing system 30''' includes test assembly 32 and load applicator 34'''. Test assembly 32 includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Load applicator 34''' includes applicator part 54a'' and applicator part 54b''. Applicator part 54a'' includes applicator body 56a''' and applicator surface 58a'''. Applicator part 54b'' includes applicator body 56b''' and applicator surface 58b'''.

Shaft testing system 30''' is substantially similar to shaft testing system 30 (best seen in FIG. 2), shaft testing system 30' (FIG. 7), and shaft testing system 30" (FIG. 8). Applicator part 54a'' can be, for example, a cylinder with a circular cross-section and has a curved applicator surface 58a'' configured to interface with and, in some examples, directly contact shaft segment 36a such that applicator part 54a'' can apply a point load. It is understood that the cross-sectional shape of applicator part 54a'' can be any shape suitable for generating a point load. Applicator part 54a" has a smaller radius of curvature than shaft segment 36a to apply the point load. Applicator part 54b" is a cylinder with a circular cross-section having a curved applicator surface 58b''' configured to interface with and, in some examples, directly contact shaft segment 36b such that applicator part 54b" can apply a point load. It is understood that the cross-sectional shape of applicator part 54b" can be any shape suitable for generating a point load. Applicator part 54b" has a smaller radius of curvature than shaft segment 36b to apply the point load. Applicator parts 54a", 54b" extend along axis 40 and at least partially into test assembly 32. Applicator parts 54a", 54b" can extend axially through test assembly 32. Applicator part 54a" can be disposed within the circumferential gap between first circumferential end 46b and second circumferential end 48b.

During operation, applicator parts 54a", 54b" apply forces F1, F2 to test assembly 32a such that shaft segments 36a, 36b experience tensile forces. Forces Fl, F2 are applied as point loads by applicator parts 54a", 54b" to allow shaft segments 36a, 36b to experience some bending during testing. By allowing shaft segments 36a, 36b to bend, the shaft test can allow for further analysis of fastener joints 42a, 42b when fastener joints 42a, 42b are not experiencing pure shear stress and can further determine additional data regarding relative displacement due to the shear stresses. As shaft segments 36a, 36b experience bending deformation, fasteners 38a, 38b can shift from purely radial alignment thereby altering the force profile at fastener joints 38a, 38b. Shaft testing system 30''' can thereby provide additional control over the bending experienced to further analyze shaft joints under less than ideal conditions.

Figure 10:
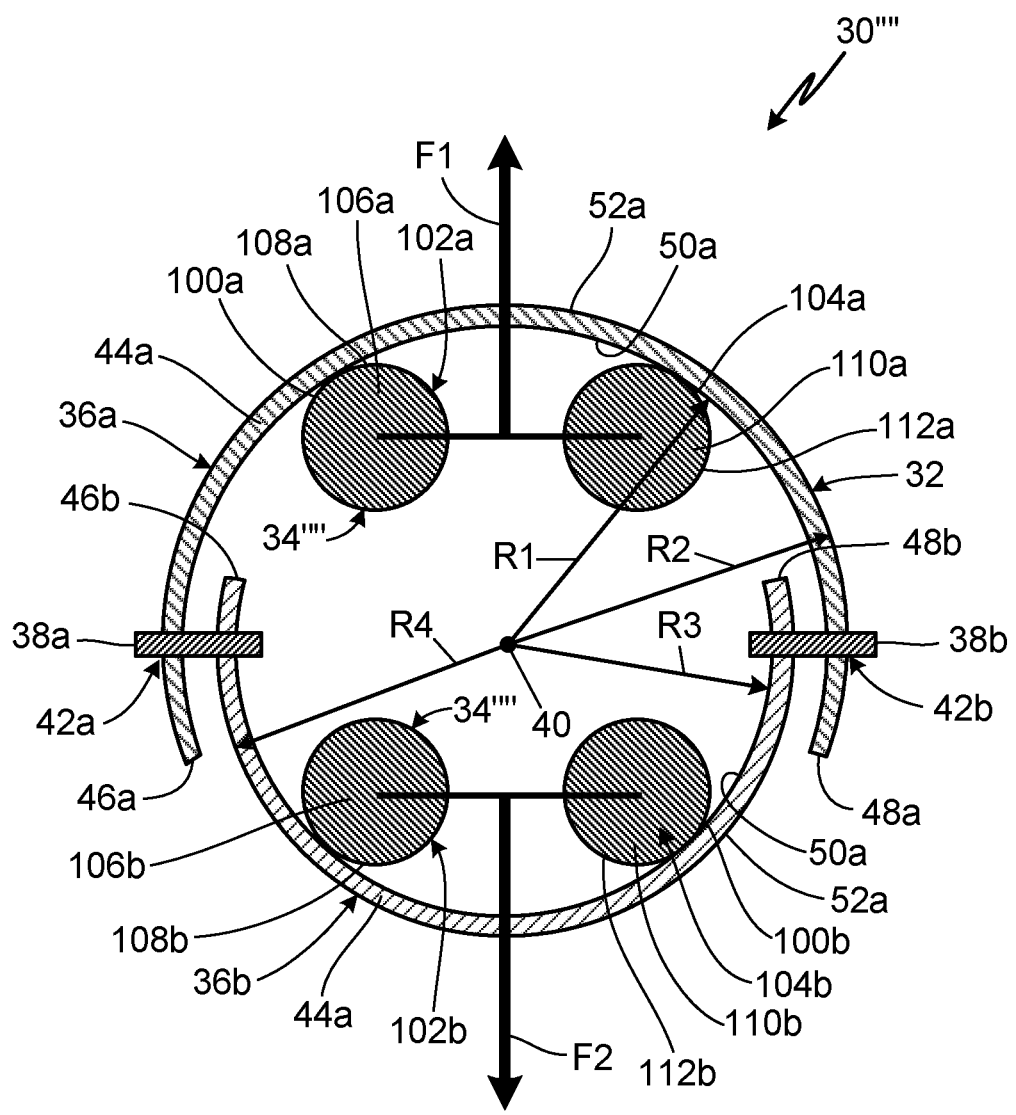
FIG. 10 is a cross-sectional view showing a fourth test system.

FIG. 10 is a cross-sectional view of shaft testing system 30''''. Shaft testing system 30'''' includes test assembly 32 and load applicator 34''. Test assembly 32 includes shaft segment 36a, shaft segment 36b, fasteners 38a, 38b, and axis 40. Shaft segment 36a includes segment body 44a, first circumferential end 46a, second circumferential end 48a, inner surface 50a, and outer surface 52a. Shaft segment 36b includes segment body 44b, first circumferential end 46b, second circumferential end 48b, inner surface 50b, and outer surface 52b. Load applicator 34'' includes applicator assembly 100a and applicator assembly 100b. Applicator assembly 100a includes first applicator part 102a, second applicator part 104a, and bracket 105a. First applicator part 102a includes first applicator body 106a and first applicator surface 108a. Second applicator part 104a includes second applicator body 110a, second applicator surface 112a, and bracket 105b. Applicator assembly 100b includes first applicator part 102b and second applicator part 104b. First applicator part 102b includes first applicator body 106b and first applicator surface 108b. Second applicator part 104b includes second applicator body 110b and second applicator surface 112b.

Shaft testing system 30'''' is substantially similar to shaft testing system 30 (best seen in FIG. 2), shaft testing system 30' (FIG. 7), shaft testing system 30'' (FIG. 8), and shaft testing system 30''' (FIG. 9). First applicator part 102a can be a cylinder and has a curved first applicator surface 108a configured to interface with and, in some examples, directly contact shaft segment 36a such that first applicator part 102a can apply a point load. First applicator part 102a has a smaller radius of curvature than shaft segment 36a to apply a point load. Second applicator part 104a can be a cylinder that has a curved second applicator surface 112a configured to interface with and, in some examples, directly contact shaft segment 36a such that second applicator part 104a can apply a point load. Second applicator part 104a has a smaller radius of curvature than shaft segment 36a to apply a point load. Bracket 105a is configured to support first applicator part 102a relative second applicator part 104a. Bracket 105a maintains a space between first applicator part 102a and second applicator part 104a to maintain a distance between point loads. While each applicator assembly 100a, 100b is shown as including two applicator parts and a single bracket, it is understood that each applicator assembly 100a, 100b can include as many applicator parts as desired and can include an associated number of brackets to maintain desired spacing. It is further understood that the brackets can be of various lengths in examples that include multiple brackets.

First applicator part 102b can be a cylinder that has a curved first applicator surface 108b configured to interface with and, in some examples, directly contact shaft segment 36b such that first applicator part 102b can apply a point load. First applicator part 102b has a smaller radius of curvature than shaft segment 36b to apply a point load. Second applicator part 104b can be a cylinder that has a curved second applicator surface 112b configured to interface with and, in some examples, directly contact shaft segment 36b such that second applicator part 104b can apply a point load. Second applicator part 104b has a smaller radius of curvature than shaft segment 36b to apply a point load. Bracket 105b is configured to support first applicator part 102b relative second applicator part 104b. Bracket 105b maintains a space between first applicator part 102b and second applicator part 104b to maintain a distance between point loads. First applicator parts 102a, 102b and second applicator parts 10a, 104b extend along axis 40 and at least partially into test assembly 32. First applicator parts 102a, 102b and second applicator parts 104a, 104b can extend through test assembly 32.

During operation, first applicator parts 102a, 102b and second applicator parts 104a, 104b apply forces F1, F2 as point loads to shaft segments 36a, 36b. By applying multiple point loads to each of shaft segments 36a, 36b, shaft testing assembly 30'''' allows for shaft segments 36a, 36b to experience some bending, but limits bending deformation through offset point loads. As a result, shaft test assembly 32'' can assess varying degrees of bending deformation in shaft segments 36a, 36b.

The radii of the various applicator parts 54a, 54b; 54a', 54b'; 54a", 54b"; 92a, 92b; 102a, 102b; 104a, 104b can be altered to increase or decrease the circumferential distribution of the forces on shaft segments 36a, 36b. The circumferential length of applicator part 90a, 90b can be altered to further control the bending forces. The load assemblies 34, 34', 34'', 34''', 34'''' thereby facilitate a dynamic test environment for drive shafts. It is understood that various applicator parts 54a, 54b; 54a', 54b'; 54a", 54b"; 92a, 92b; 102a, 102b; 104a, 104b can be combined in any suitable arrangement such that they provide at least one point of contact on each of shaft segments 36a, 36b.

FIG. 11A is a side view of test assembly 32. FIG. 11B is a side view of test assembly 132. FIG. 11C is a side view of test assembly 232. FIG. 11D is a side view of test assembly 332. FIG. 11E is a side view of test assembly 432. FIG. 11F is a side view of test assembly 532. FIGS. 11A, 11B, 11C, 11D, 11E, and 11F will be discussed together. Test assembly 32 includes shaft segment 36a, shaft segment 36b, and fastener array 114a. Test assembly 132 includes shaft segment 36a, shaft segment 36b, and fastener array 114a'. Fastener array 114a' includes a plurality of fasteners. Test assembly 232 includes shaft segment 36a, shaft segment 36b, and fastener array 114a". Fastener array 114a" includes a plurality of fasteners. Test assembly 332 includes shaft segment 36a, shaft segment 36b, and fastener array 114a'''. Fastener array 114a''' includes a plurality of fasteners. Test assembly 432 includes shaft segment 36a, shaft segment 36b, and fastener array 114a''''. Fastener array 114a'''' includes a plurality of fasteners. Test assembly 532 includes shaft segment 36a, shaft segment 36b, and fastener array 114a'''''. Fastener array 114a''''' includes a plurality of fasteners Fasteners secure shaft segments 36a, 36b together to form test assemblies 32, 132, 232, 332, 432, and 532. Each test assembly includes an array of fasteners arranged to resist shearing. It is understood that one lateral side of each test assembly is shown and that each test assembly includes two fastener arrays disposed on opposite lateral sides. The two fastener arrays can be mirror images.

In FIG. 11A, fastener array 114a includes a single fastener extending through shaft segment 36a and shaft segment 36b to secure shaft segment 36a to shaft segment 36b. The single fastener can be disposed on the axial midline of one or both of shaft segment 36a and shaft segment 36b.

In FIG. 11B, fastener array 114a' includes a plurality of fasteners. The plurality of fasteners forming fastener array 114a' are arranged such that each fastener is disposed circumferentially, or vertically, from the previous fastener. While fastener array 114a' is shown as including two fasteners, it is understood that fastener array 114a' can include as many or as few fasteners as desired, such as three, four, five, or more.

In FIG. 11C, fastener array 114a" includes a plurality of fasteners. The plurality of fasteners forming fastener array 114a" are arranged such that each fastener is disposed axially from the adjacent fastener. While fastener array 114a" is shown as including two fasteners, it is understood that fastener array 114a" can include as many or as few fasteners as desired, such as three, four, five, or more.

In FIG. 11D, fastener array 114a''' includes a plurality of fasteners. The plurality of fasteners forming fastener array 114a''' are arranged in vertical columns and horizontal rows. In the example shown, the plurality of fasteners form a rectangular pattern. In some examples, the plurality of fasteners can form a square pattern. While fastener array 114a''' is shown as including two rows and two columns, it is understood that fastener array 114a''' can include any desired number of rows and any desired number of columns. In some examples, the number of rows is different from the number of columns.

In FIG. 11E, fastener array 114a'''' includes a plurality of fasteners. The plurality of fasteners forming fastener array 114a'''' are arranged in alternating vertical columns and horizontal rows such that the plurality of fasteners form alternating stacks of fasteners. The adjacent rows are offset axially relative each other and the adjacent columns are offset circumferentially, or vertically, from each other. Fastener array 114a'''' can include additional fastener rows and/or columns.

In FIG. 11F, fastener array 114a''''' includes a plurality of fasteners. The plurality of fasteners forming fastener array 114a''''' are arranged in columns and rows. Each row has a different number and pattern of fasteners than each adjacent row. For example, the middle row in the example shown has multiple fasteners while the rows on either side of the middle row have one fastener. In the example show, fastener array 114a''''' is arranged to form a rotated rectangular pattern. In some examples, fastener array 114a''''' can be considered to be rhomboidally shaped. Fastener array 114a''''' can be considered to form a repeating pattern in the circumferential direction, similar to fastener array 114a''''.

Figure 12:
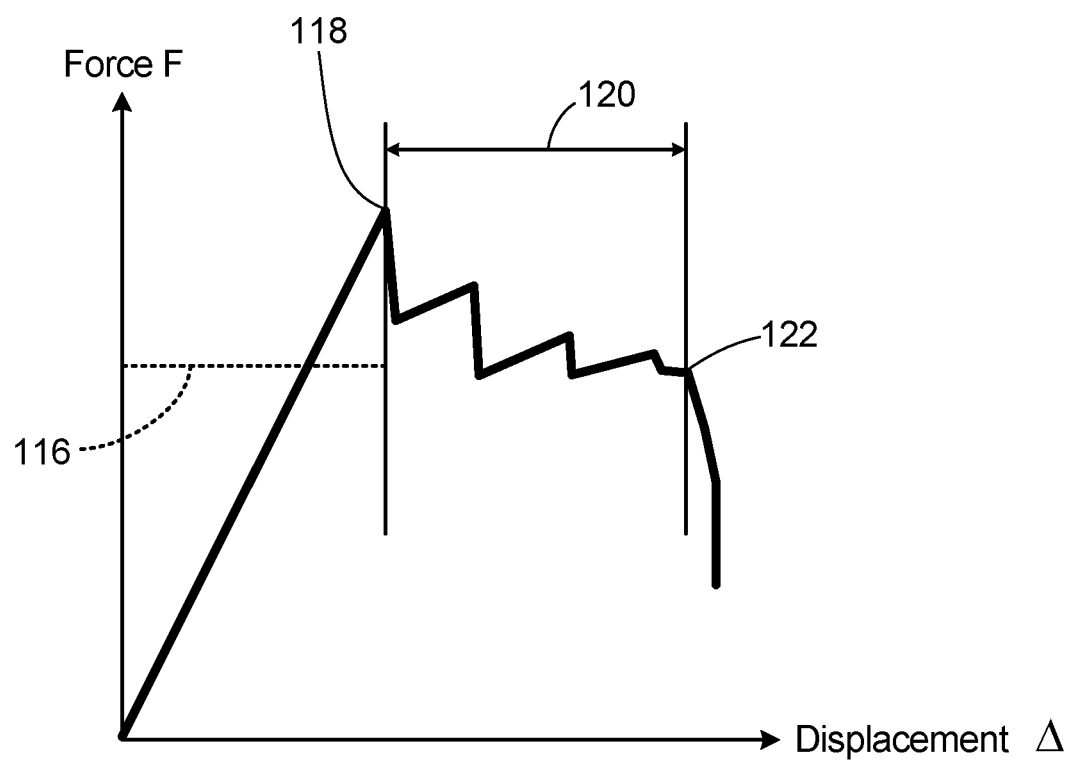
FIG. 12 is a graph showing force versus displacement for a shaft test under displacement-controlled loading.

FIG. 12 is a graph depicting force F versus displacement A under displacement-controlled loading. In some examples, force F can be measured in Newtons, pounds-force, or any other desired unit system. In some examples displacement A can be measured in millimeters, centimeters, inches, or any other desired unit system. Allowable operating threshold 116, peak load 118, multi-step progressive displacement zone 120, and critical failure point 122 are shown. Allowable operating threshold 116 is the functional limit of force F and displacement A which can be determined relative peak load 118 and critical failure point 122. In the example, force F can represent either force F1 or force F2, and displacement A can represent mutual elongation between applicator parts 54a, 54b.

During operation, force is applied to a test assembly. Peak load 118 is the point where force F is at a maximum, but structural integrity can still be maintained. Peak load 118 can be determined as the point at which a fastener joint fails. For example, the point at which a sudden drop in force F is experienced along with an increase in displacement. Multi-step progressive displacement zone 120 can be observed in a zone following peak load 118 wherein structural integrity has been compromised but the structure has not failed. As shown, displacement A continues to grow while the force F exerted drops through a series of periodic increases of force F followed by sharp decreases of force F. Multi-step progressive displacement zone 120 can include multiple increasing periods of force F and decreasing periods of force F. Critical failure point 122 is the point where structural integrity has failed. The force F does not rise as displacement continues to increase. The allowable operating threshold 116 can be determined by applying a factor of safety to the peak load 118.

Figure 13:
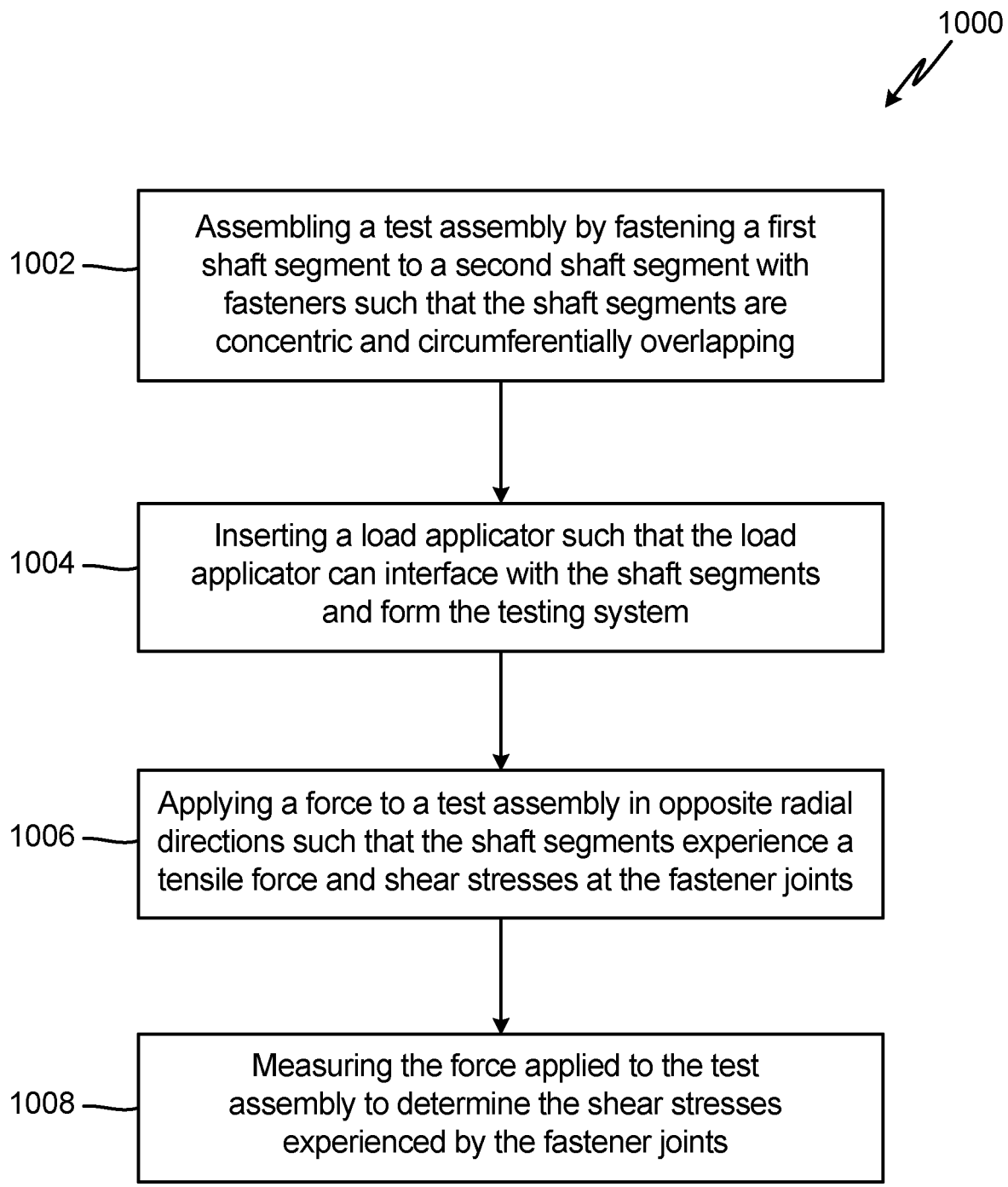
FIG. 13 is a flow chart of a method of testing a shaft.

FIG. 13 is a flow chart of method 1000. Method 1000 includes step 1002, step 1004, step 1006, and step 1008. In step 1002, test assembly 32 is assembled by fastening shaft segment 36a to shaft segment 36b with fasteners 38a, 38b such that shaft segment 36a and shaft segment 36b are concentric and circumferentially overlapping.

In step 1004, load applicator 34 is inserted at least partially into test assembly 32. Load applicator 34 can extend axially fully through test assembly 32. Load applicator 34 interfaces with the shaft segments forming the testing system.

In step 1006, load applicator 34 applies force to test assembly 32 by displacing applicator parts interfacing with the shaft segments in opposite radial directions. The forces generate tensile forces in test assembly 32. The tensile forces in test assembly 32 are transmitted to fastener joints 42a, 42b that experience shear stress.

In step 1008, the force applied to test assembly 32 is measured to determine the shear stresses experienced by fastener joints 42a, 42b and thus the peak load 118 and critical failure point 122 of test assembly 32. Peak load 118 can be determined by measuring the force on test assembly 32 and recording the maximum experienced when the test assembly initially fails. Data regarding the structural integrity and characteristics of the test specimen can be determined based on the forces and displacement experienced by test assembly 32 during loading.

Discussion of Possible Embodiments

The following are non-exclusive descriptions of possible embodiments of the present invention.

A method of testing a shaft includes displacing a first applicator part relative a second applicator part to exert a tensile force on a shaft test assembly and measuring the shear force generated by the tensile force in the shaft test assembly. The first applicator part extends at least partially through the shaft test assembly and contacts a first shaft segment of the shaft test assembly. The second applicator part extends at least partially through the shaft test assembly and contacts a second shaft segment of the shaft test assembly. The first shaft segment is connected to the second shaft segment by a first and second fastener.

The method of the preceding paragraph can optionally include, additionally and/or alternatively, any one or more of the following features, configurations and/or additional components:

A first shaft section is prepared by cutting the first shaft section from a first shaft to a first width. A second shaft section is prepared by cutting the second shaft section from a second shaft to a second width. A first shaft segment is prepared by removing a first circumferential portion of the first shaft section. A second shaft segment is prepared by removing a second circumferential portion of the second shaft section.

The first shaft section and the second shaft section are prepared by cutting them to the same width.

The shaft test assembly is prepared by fastening the first shaft segment to the second shaft segment such that the first fastener is disposed 180-degrees from the second fastener.

The shaft test assembly is prepared by fastening the first shaft segment to the second shaft segment with the first fastener such that the first fastener extends radially relative an axis through the shaft test assembly and fastening the first shaft segment to the second shaft segment with the second fastener such that the second fastener extends radially relative the axis.

The step of displacing the first applicator part relative the second applicator part to exert the force on the test assembly comprises: exerting a first force, by the first applicator part, in a first radial direction and on the first shaft segment, and exerting a second force, by the second applicator part, in a second radial direction and on the second shaft segment.

A shaft test assembly includes a first shaft segment having a first body extending from a first circumferential end to a second circumferential end, a second shaft segment having a second body extending from a third circumferential end to a fourth circumferential end, a first fastener extending through the first body and the second body, and a second fastener extending through the first body and the second body. The second fastener is disposed opposite the first fastener.

The shaft test assembly of the preceding paragraph can optionally include, additionally and/or alternatively, any one or more of the following features, configurations and/or additional components:

The first shaft segment has a first inner diameter, the second shaft segment has a second inner diameter, and the first inner diameter is greater than the second inner diameter.

The first shaft segment is a composite shaft and the second shaft segment is a metallic shaft.

The first shaft segment is a metallic shaft and the second shaft segment is a composite shaft.

A third shaft segment having a third body extending between a fifth circumferential end and a sixth circumferential end and a spacer segment having a spacer body. The first fastener extends through the third body then the first body and then the second body. The second shaft segment is concentrically aligned with the third shaft segment and is disposed radially between the fifth circumferential end and the sixth circumferential end. The spacer section is disposed radially between the second body and the third body.

The first fastener includes a first plurality of fasteners and the second fastener includes a second plurality of fasteners. The first and second plurality of fasteners are each arranged in a pattern selected from a group including a vertical stack of fasteners, a horizontal stack of fasteners, a rectangular arrangement of fasteners, an alternating stack of fasteners, and a rhomboidal stack of fasteners.

A shaft test system includes a shaft test assembly having an axis, a first applicator part extending into the shaft test assembly and contacting the first body of the shaft test assembly, and a second applicator part extending into the shaft test assembly and contacting the second body of the shaft test assembly. The shaft test assembly includes a first shaft segment having a curved first body extending from a first circumferential end to a second circumferential end, a second shaft segment having a curved second body extending from a third circumferential end to a fourth circumferential end, a first fastener extending through the first body and the second body, and a second fastener extending through the first body and the second body. The first internal part is configured to exert a first force on the first body in a first radial direction and the second internal part is configured to exert a second force on the second body in a second radial direction. The first radial direction is opposite the second radial direction.

The shaft test system of the preceding paragraph can optionally include, additionally and/or alternatively, any one or more of the following features, configurations and/or additional components:

The first internal part is displaceable relative the second internal part.

At least a portion of the first internal part is disposed between the first circumferential end and the second circumferential end.

A first annular gap is disposed between the third circumferential end and fourth circumferential end, and wherein the first internal part is disposed at least partially within the first annular gap.

The first internal part and the second internal part have one of a circular cross-section and a semi-circular cross-section.

The first internal part comprises a first plurality of applicator parts, and the second internal part comprises a second plurality of applicator parts.

The first plurality of applicator parts includes one of a plurality of internal parts contacting a first inner face of the first body and at least one internal part contacting the first inner face and at least one external part contacting an external face of the first body. the second plurality of applicator parts includes one of a plurality of internal parts contacting a first inner face of the first body and at least one internal part contacting the first inner face and at least one external part contacting an external face of the first body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of testing a shaft, the method comprising:
displacing a first applicator part relative a second applicator part to exert a first tensile force on a shaft test assembly;
measuring a shear force experienced by the shaft test assembly;
wherein the first applicator part extends at least partially through the shaft test assembly and contacts a first shaft segment of the shaft test assembly;
wherein the second applicator part extends at least partially through the shaft test assembly and contacts a second shaft segment of the shaft test assembly; and
wherein the first shaft segment is connected to the second shaft segment by a first fastener and a second fastener.

2. The method of claim 1, further comprising:
cutting a first shaft section from a first shaft to a first width;
cutting a second shaft section from a second shaft to a second width;
removing a first circumferential portion of the first shaft section to form the first shaft segment; and
removing a second circumferential portion of the second shaft section to form the second shaft segment.

3. The method of claim 2, further comprising cutting the first shaft section and the second shaft section such that the first width is the same as the second width.

4. The method of claim 2, wherein:
removing the first circumferential portion of the first shaft section to form the first shaft segment comprises:
cutting the first circumferential portion from the first shaft section such that the first shaft section forms a first arcuate segment with a first arc angle greater than 180-degrees between a first circumferential end and a second circumferential end; and
cutting the second circumferential portion from the second shaft section such that the second shaft section forms a second arcuate segment with a second arc angle greater than 180-degrees between a third circumferential end and a fourth circumferential end.

5. The method of claim 1, further comprising fastening the first shaft segment to the second shaft segment such that the first fastener is disposed 180-degrees from the second fastener.

6. The method of claim 1, further comprising:
joining the first shaft segment to the second shaft segment with the first fastener such that the first fastener extends radially relative to an axis through the shaft test assembly; and
joining the first shaft segment to the second shaft segment with the second fastener such that the second fastener extends radially relative the axis.

7. The method of claim 5, wherein displacing the first applicator part relative the second applicator part to exert the force on the test assembly comprises:
exerting a first force, by the first applicator part, in a first radial direction and on the first shaft segment;
exerting a second force, by the second applicator part, in a second radial direction and on the second shaft segment;
wherein the first radial direction is opposite the second radial direction.

8. A shaft test assembly comprising:
a first shaft segment having a first body extending from a first circumferential end to a second circumferential end;
a second shaft segment having a second body extending from a third circumferential end to a fourth circumferential end;
a first fastener extending through the first body and the second body; and
a second fastener extending through the first body and the second body;
wherein the second fastener is disposed opposite the first fastener.

9. The shaft test assembly of claim 8, wherein the first shaft segment has a first inner diameter, the second shaft segment has a second inner diameter, and the first inner diameter is greater than the second inner diameter.

10. The shaft test assembly of claim 9, wherein the first shaft segment is a composite shaft and the second shaft segment is a metallic shaft.

11. The shaft test assembly of claim 9, wherein the first shaft segment is a metallic shaft and the second shaft segment is a composite shaft.

12. The shaft test assembly of claim 9, further comprising:
a third shaft segment having a third body extending between a fifth circumferential end and a sixth circumferential end; and
a spacer segment having a spacer body;
wherein the first fastener extends through the third body then the first body and then the second body;
wherein the second shaft segment is concentrically aligned with the third shaft segment and is disposed radially between the fifth circumferential end and the sixth circumferential end; and
wherein the spacer section is disposed radially between the second body and the third body.

13. The shaft test assembly of claim 9, wherein:
the first fastener includes a first plurality of fasteners;
the second fastener includes a second plurality of fasteners; and
the first plurality of fasteners and the second plurality of fasteners are each arranged in a pattern selected from a group including a vertical stack of fasteners, a horizontal stack of fasteners, a rectangular arrangement of fasteners, an alternating stack of fasteners, and a rhomboidal stack of fasteners.

14. A shaft test system comprising:
a shaft test assembly having an axis, the test assembly comprising:
a first shaft segment having a curved first body extending from a first circumferential end to a second circumferential end;
a second shaft segment having a curved second body extending from a third circumferential end to a fourth circumferential end;
a first fastener extending through the first body and the second body; and
a second fastener extending through the first body and the second body;
a first applicator part extending into the shaft test assembly and contacting the first body; and
a second applicator part extending into the shaft test assembly and contacting the second body;
wherein the first applicator part is configured to exert a first force on the first body in a first radial direction and the second applicator part is configured to exert a second force on the second body in a second radial direction; and
wherein the first radial direction is opposite the second radial direction.

15. The shaft test system of claim 14, wherein the first applicator part is displaceable relative the second applicator part.

16. The shaft test system of claim 15, wherein at least a portion of the first applicator part is disposed between the first circumferential end and the second circumferential end.

17. The shaft test system of claim 14, wherein a first annular gap is disposed between the third circumferential end and fourth circumferential end, and wherein the first applicator part is disposed at least partially within the first annular gap.

18. The shaft test assembly of claim 14, wherein the first applicator part and the second applicator part have one of a circular cross-section and a semi-circular cross-section.

19. The shaft test assembly of claim 14, wherein:
the first applicator part comprises a first plurality of contact parts; and
the second applicator part comprises a second plurality of contact parts.

20. The shaft test assembly of claim 19, wherein:
the first plurality of contact parts comprises one of:
  a plurality of applicator parts contacting a first inner face of the first body; and
  at least one applicator part contacting the first inner face and at least one external part contacting an external face of the first body; and
the second plurality of contact parts comprises one of:
  a plurality of applicator parts contacting a second inner face of the second body; and
  at least one applicator part contacting the second inner face and at least one external part contacting an external face of the second body.

* * * * *